United States Patent
Hong et al.

(10) Patent No.: US 11,088,808 B2
(45) Date of Patent: Aug. 10, 2021

(54) METHOD AND TERMINAL FOR TRANSMITTING HARQ ACK/NACK SIGNAL USING SIDELINK

(71) Applicant: LG Electronics Inc., Seoul (KR)

(72) Inventors: Uihyun Hong, Seoul (KR); Youngtae Kim, Seoul (KR); Hanbyul Seo, Seoul (KR); Sungyong Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/477,298

(22) PCT Filed: Jan. 12, 2018

(86) PCT No.: PCT/KR2018/000596
§ 371 (c)(1),
(2) Date: Jul. 11, 2019

(87) PCT Pub. No.: WO2018/131922
PCT Pub. Date: Jul. 19, 2018

(65) Prior Publication Data
US 2020/0007297 A1    Jan. 2, 2020

Related U.S. Application Data

(60) Provisional application No. 62/445,745, filed on Jan. 13, 2017.

(51) Int. Cl.
*H04L 5/00* (2006.01)
*H04L 1/18* (2006.01)
(Continued)

(52) U.S. Cl.
CPC .......... *H04L 5/0055* (2013.01); *H04L 1/1812* (2013.01); *H04L 5/0007* (2013.01);
(Continued)

(58) Field of Classification Search
None
See application file for complete search history.

(56) References Cited

U.S. PATENT DOCUMENTS

2014/0018027 A1*   1/2014   Wilhelmsson ....... H03G 3/3078
                                                          455/234.1
2015/0327180 A1*  11/2015   Ryu ...................... H04W 52/18
                                                             370/329
(Continued)

OTHER PUBLICATIONS

Interdigital Communications, "A Common Framework for Control Channel Design for NR," R1-1612645, 3GPP TSG RAN WG1 Meeting #87, Reno, USA, Nov. 5, 2016, see sections 2-4; and figure 1.
(Continued)

*Primary Examiner* — Saba Tsegaye
(74) *Attorney, Agent, or Firm* — Dentons US LLP

(57) ABSTRACT

A disclosed feature of the present specification is to provide a method for transmitting a hybrid automatic repeat request (HARQ) acknowledgement/negative-acknowledgement (ACK/NACK) signal using a sidelink. The method may comprise the steps of: receiving from a transmission terminal data in a first time section within a sidelink subframe n; and transmitting a HARQ ACK/NACK signal in a second time section within the sidelink subframe n. A gap may exist between the first time section and the second time section in the sidelink subframe n. The gap can be used for switching between reception and transmission.

14 Claims, 51 Drawing Sheets

(51) Int. Cl.
  *H04W 28/04* (2009.01)
  *H04W 4/00* (2018.01)
  *H04W 4/40* (2018.01)
  *H04W 92/18* (2009.01)

(52) U.S. Cl.
  CPC ............ *H04W 4/40* (2018.02); *H04W 28/04* (2013.01); *H04W 92/18* (2013.01)

(56) References Cited

U.S. PATENT DOCUMENTS

| | | | |
|---|---|---|---|
| 2016/0135143 A1* | 5/2016 | Won | H04W 52/383 370/312 |
| 2016/0270070 A1 | 9/2016 | Mukkavilli et al. | |
| 2017/0208583 A1* | 7/2017 | Jiang | H04L 5/0055 |
| 2018/0054841 A1* | 2/2018 | Li | H04W 74/0816 |

OTHER PUBLICATIONS

Ericsson, "Transmission Principles for Data Channels," R1-163236, 3GPP TSG RAN WG1 Meeting #84bis, Busan, South Korea, Apr. 1, 2016, see section 2.

Nokia et al., "On HARQ/Scheduling Timing and Self-contained Operation," R1-1612241, 3GPP TSG-RAN WG1 #87, Reno, USA, Nov. 5, 2016, see section 2.2; and figure 2.

CATT, "NR Time Domain Structure Slot and Mini-slot and Time Interval," R1-1611366, 3GPP TSG RAN WG1 Meeting #87, Reno, NV, USA, Nov. 5, 2016, see sections 2, 3.

Samsung, "High order modulation in V2X", 3GPP TSG RAN WG1 Meeting #89, May 15-19, 2017, R1-1707906.

Panasonic, "Discussion on sidelink feedback in FeD2D", Aug. 21-25, 2017, R1-1713856.

* cited by examiner

METHOD AND TERMINAL FOR TRANSMITTING HARQ ACK/NACK SIGNAL USING SIDELINK

CROSS-REFERENCE TO RELATED APPLICATIONS

This application is the National Stage filing under 35 U.S.C. 371 of International Application No. PCT/KR2018/000596, filed on Jan. 12, 2018, which claims the benefit of U.S. Provisional Application No. 62/445,745 filed on Jan. 13, 2017, the contents of which are all hereby incorporated by reference herein in their entirety.

BACKGROUND OF THE INVENTION

Field of the Invention

The present invention relates to a mobile communication.

Related Art

With the success of long term evolution (LTE)/LTE-A (LTE-Advanced) for the 4th generation mobile communication, more interest is rising to the next generation, i.e., 5th generation (also known as 5G) mobile communication and extensive research and development are being carried out accordingly.

Fifth generation (5G) mobile communication defined by International Telecommunication Union (ITU) means that a data transfer rate of a maximum of 20 Gbps and a felt transfer rate of at least 100 Mbps are provided anywhere. A formal name is "IMT-2020", and 5G mobile communication has an object of commercialization in 2020 worldwide.

ITU proposes three scenarios, for example, enhanced mobile broadband (eMBB), massive machine type communication (mMTC) and ultra reliable and low latency communications (URLLC).

First, URLLC relates to a use scenario that requires high reliability and low latency. For example, there is a vehicle to vehicle (V2V) technology based on a device to device (D2D) technology.

The V2V technology may be implemented by an LTE-A-based sidelink. However, the LTE-A-based sidelink does not support the transmission and reception of a hybrid automatic repeat request (HARQ) acknowledgement/negative-acknowledgement (ACK/NACK) signal.

This is problematic because the transmission and reception of an HARQ ACK/NACK signal must be guaranteed for high reliability of URLLC.

SUMMARY OF THE INVENTION

Accordingly, the disclosure of this specification is to solve the above-described problem.

One disclosure of this specification provides a method of transmitting a hybrid automatic repeat request (HARQ) acknowledgement/negative-acknowledgement (ACK/NACK) signal through a sidelink. The method may include receiving, from a transmission UE, data in a first time region within a sidelink subframe n and transmitting an HARQ ACK/NACK signal in a second time region within the sidelink subframe n. A gap duration may be present between the first time region and second time region of the sidelink subframe n. The gap duration may be used for the switching of reception and transmission.

The HARQ ACK/NACK signal may be for data received from the transmission UE on a sidelink subframe n−k.

The gap may be a half-symbol size or one symbol size.

The second time region may include automatic gain control (AGC).

The second time region may include a reference signal for the demodulation of the HARQ ACK/NACK signal.

The last part of the second time region may further include a gap duration.

One disclosure of this specification provides a user equipment (UE) transmitting a hybrid automatic repeat request (HARQ) acknowledgement/negative-acknowledgement (ACK/NACK) signal through a sidelink. The UE may include a processor, a receiver receiving data in a first time region within a sidelink subframe n from a transmission UE, and a transmitter transmitting an HARQ ACK/NACK signal in a second time region within the sidelink subframe n. A gap duration may be present between the first time region and second time region of the sidelink subframe n. The gap duration may be used for the switching of reception and transmission.

According to the disclosure of the present invention, the problem of the conventional technology described above may be solved.

DESCRIPTION OF EXEMPLARY EMBODIMENTS

Figure 1:
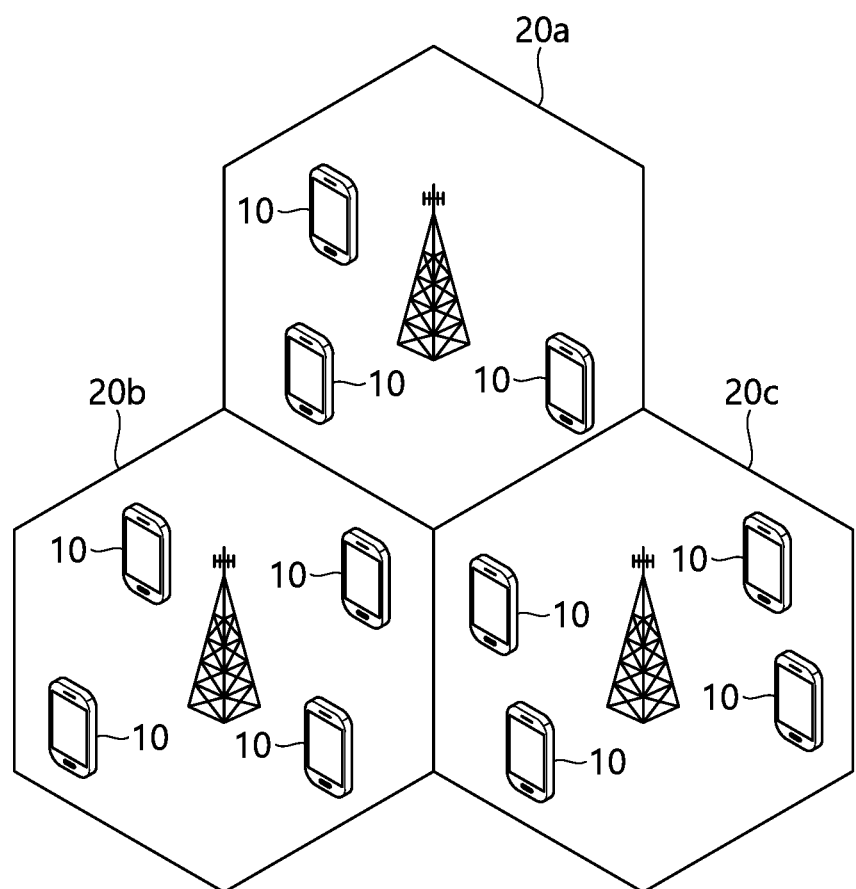
FIG. 1 shows a wireless communication system.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20*a*, 20*b*, and 20*c*. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Hereinafter, the LTE system will be described in detail.

Figure 2:
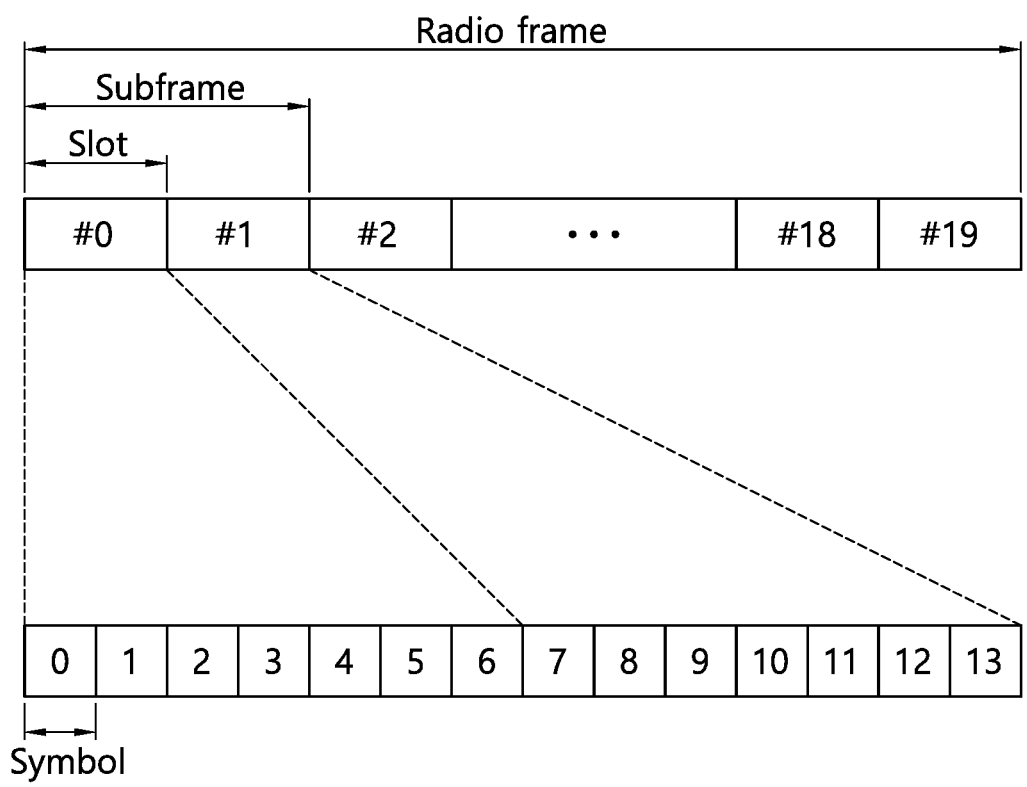
FIG. 2 shows the structure of a radio frame according to FDD in 3GPP LTE.

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011 December) "Evolved Universal Terrestrial Radio Access (E-UTRA); Physical Channels and Modulation (Release 10)".

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

One slot includes $N_{RB}$ resource blocks (RBs) in the frequency domain. For example, in the LTE system, the number of resource blocks (RBs), i.e., $N_{RB}$, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

<Device to Device (D2D) Communication>

D2D communication which is expected to be introduced into a next-generation communication system is described below.

Figure 3:
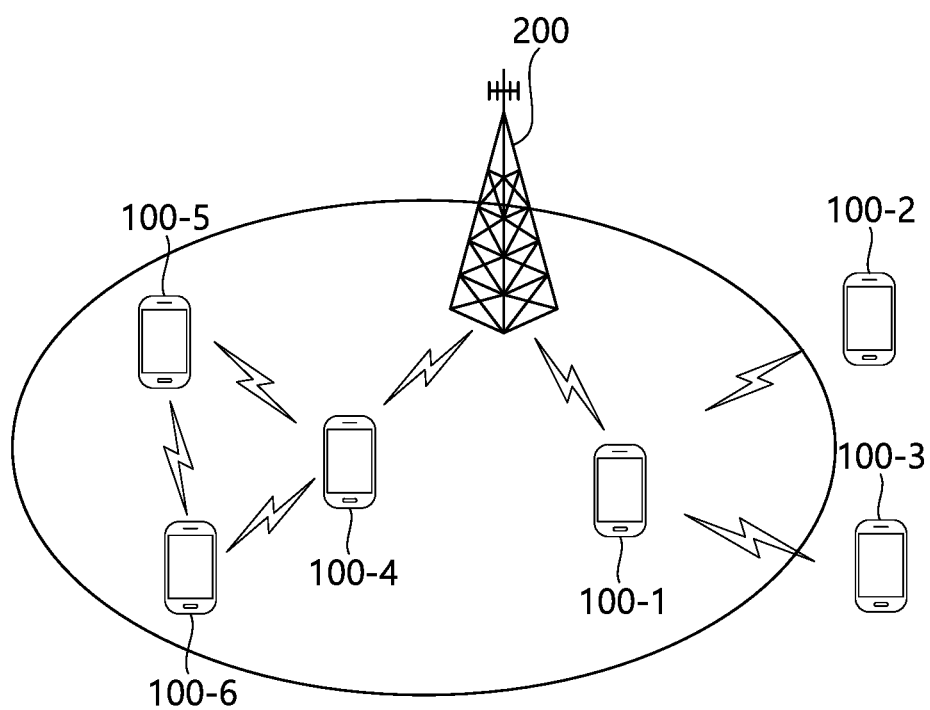
FIG. 3 shows the concept of device to device (D2D) communication expected to be introduced into a next-generation communication system.

FIG. 3 shows the concept of device to device (D2D) communication which is expected to be introduced into a next-generation communication system.

There is a need for communication between pieces of UE located at a physically close distance, that is, device to device (D2D) communication, due to an increase of user needs for social network service (SNS).

In order to reflect the aforementioned needs, as shown in FIG. 3, a scheme for direct communication between UE #1 100-1, UE #2 100-2, and UE #3 100-3 or between UE #4 100-4, UE #5 100-5, and UE #6 100-6 without the intervention of an eNodeB (eNB) 200 is being discussed. The UE #1 100-1 and the UE #4 100-4 may directly communicate with each other with the help of the base station 200. The UE #4 100-4 may play the role of a relay node for the UE #5 100-5 and the UE #6 100-6. Likewise, the UE #1 100-1 may play the role of a relay node for the UE #2 100-2 and the UE #3 100-3 which are located far from the center of a cell.

D2D communication is also called a proximity service (ProSe). Furthermore, UE that performs a ProSe is also called ProSe UE. Furthermore, a link between pieces of UE used for the D2D communication is also called a sidelink.

Physical channels used in the sidelink are as follows.

A physical sidelink shared channel (PSSCH)
A physical sidelink control channel (PSCCH)
A physical sidelink discovery channel (PSDCH)
A physical sidelink broadcast channel (PSBCH)

Furthermore, physical signals used in the sidelink are as follows.

A demodulation reference signal (DMRS)
A sidelink sync signal (SLSS)

The SLSS includes a primary sidelink sync signal (PSLSS) and a secondary sidelink sync signal (SSLSS).

Figure 4:
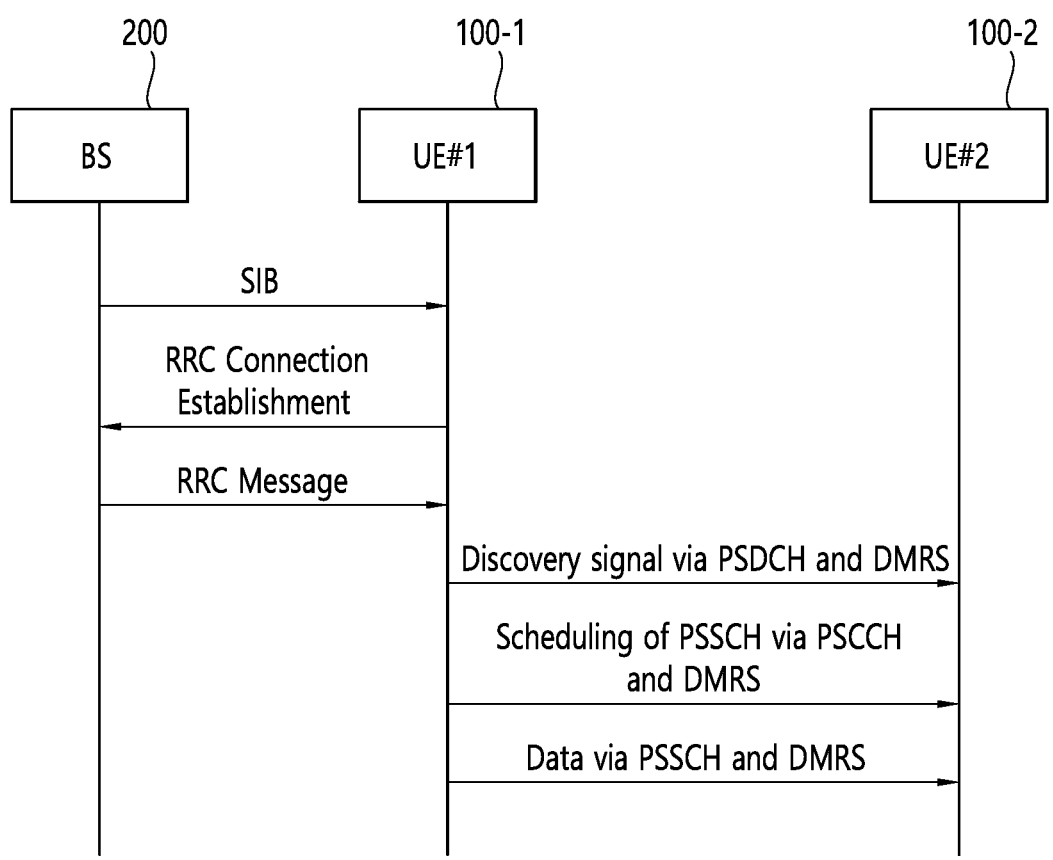
FIG. 4 shows an example of D2D communication or ProSe communication between a UE #1 and UE #2 shown in FIG. 3.

FIG. 4 shows an example of D2D communication or ProSe communication between UE #1 and UE #2 shown in FIG. 3.

Referring to FIG. 4, the base station 200 broadcasts a system information block (SIB) to the cell.

The SIB may include information about a resource pool related to D2D communication. The information about a resource pool related to D2D communication may be divided into an SIB type 18 and an SIB type 19.

The SIB type 18 may include resource configuration information for D2D communication. Furthermore, the SIB type 19 may include resource configuration information for D2D discovery.

The UE #1 100-1 located in coverage of the base station 200 establishes RRC connection with the base station 200.

Furthermore, the UE #1 100-1 receives an RRC message, for example, an RRC Connection Reconfiguration message from the base station 200. The RRC message includes a discovery configuration (hereinafter referred to as "discConfig"). The discConfig includes configuration information about a discover resource pool (hereinafter referred to as "DiscResourcePool"). The DiscResourcePool includes information listed in the following table.

In order for the UE #1 100-1 to discover suitable UE nearby for D2D communication or ProSe communication or in order for the UE #1 100-1 to provide notification of its presence, it may send a discovery signal through a PSDCH.

Furthermore, the UE #1 100-1 may send scheduling assignment (SA) through a PSCCH. Furthermore, the UE #1 100-1 may send a PSSCH including data based on the scheduling assignment (SA).

<Vehicle-to Everything (V2X)>

The contents regarding D2D may also be applied to vehicle-to-everything (V2X). V2X collectively refers to a communication technology through a vehicle and all of interfaces. An implementation form of V2X may be as follows.

First, in V2X, "X" may be a vehicle. In this case, V2X may be indicated as vehicle-to-vehicle (V2V) and may mean communication between vehicles.

Figure 5:
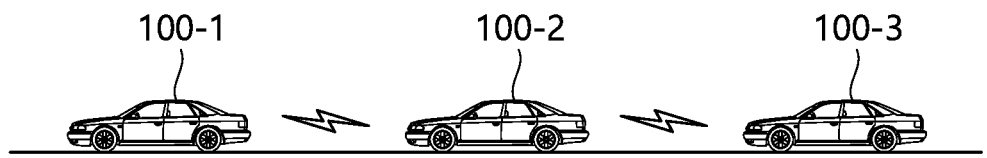
FIG. 5 is an explanatory diagram showing the concept of V2X.

FIG. 5 is an exemplary diagram showing the concept of V2X.

As may be seen with reference to FIG. 5, vehicles (i.e., radio devices 100-1, 100-2, and 100-3 mounted on the vehicles) may perform mutual communication.

In V2X, "X" may mean a person or a pedestrian. In this case, V2X may be indicated as a vehicle-to-person or vehicle-to-pedestrian (V2P). In this case, the pedestrian is not necessarily limited to a person who walks, but may include a person who rides a bicycle and a driver or passenger on a (specific speed or less) vehicle.

Alternatively, "X" may mean an infrastructure/network. In this case, V2X may be indicated as vehicle-to-infrastructure (V2I) or a vehicle-to-network (V2N), and may mean communication between a vehicle and a roadside unit (RSU) or between a vehicle and a network. The RSU may be traffic-related infrastructure, for example, a device that provides notification of speed. The RSU may be implemented in a base station or fixed UE.

Meanwhile, the above V2X technology uses a sidelink (that is, D2D communication) technology. In an existing sidelink (that is, D2D communication) technology, for hardware restriction of UE and coexistence with existing LTE/LTE-A communication, a V2X UE does not use a first symbol OFDM/SC-FDMA symbol and a final symbol OFDM/SC-FDMA symbol of a subframe. The above will be described in detailed as follows.

After Sidelink meaning communication between UEs in 3GPP is firstly introduced from D2D of Rel-12, the sidelink is recently applied to eD2D and V2V. However, due to coexistence with uplink and restriction of UE RF HW on an LTE Network, there are several restrictions as follows.

First, a final OFDM/SC-FDMA symbol in a subframe is not transmitted in order to prevent UL/DL collision upon coexistence with existing LTE/LTE-A communication. Further, one Tx RF chain inside UE is commonly used for sidelink with LTE/LTE-A. A final OFDM/SC-FDMA symbol is not transmitted but is used as a switching time between the LTE/LTE-A and the sidelink.

Further, 1~2 OFDM/SC-FDMA symbols of a front part in the subframe may not be used by reception (Rx) automatic gain control (AGC) of reception UE (A gain control value may not be changed in a middle of the symbol in an OFDM/SC-FDMA based transmission scheme).

The above will be described in detail with reference to the accompanying drawings.

Figure 6A:
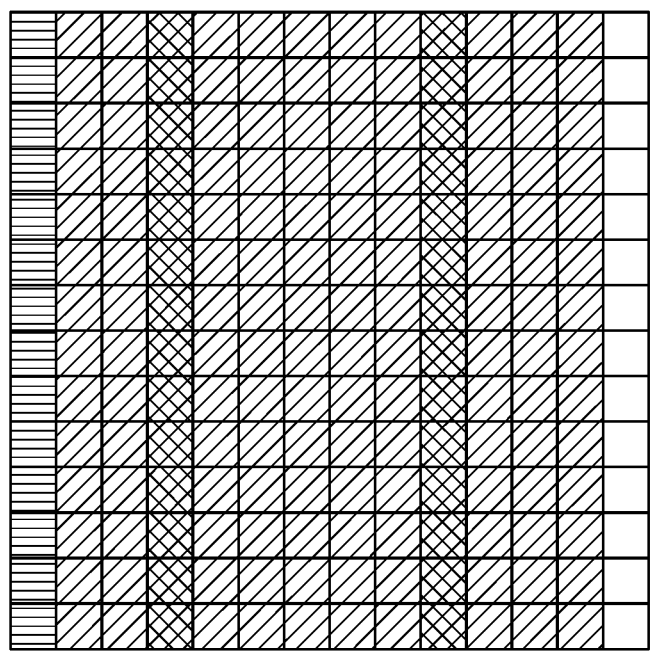
FIG. 6a shows a subframe used for D2D communication.
Figure 6B:
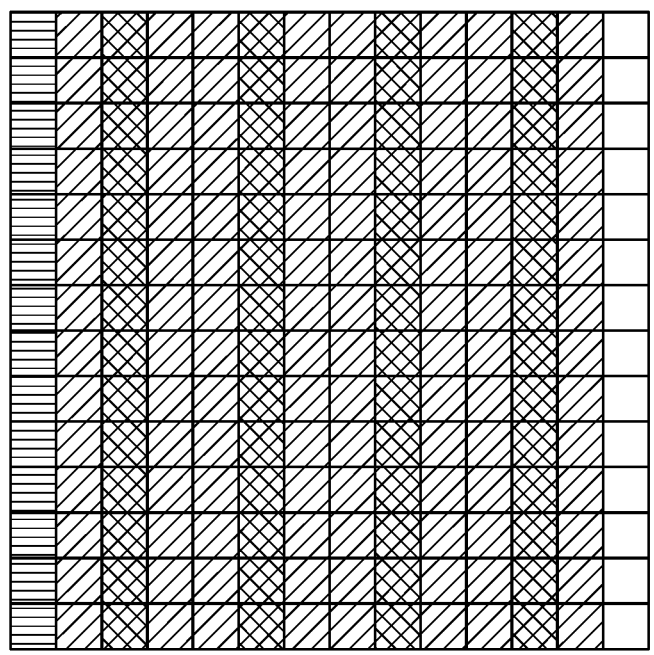
FIG. 6b shows the structure of a subframe used for V2V communication.

FIG. 6a illustrates a subframe used for D2D communication, and FIG. 6b illustrates a structure of a subframe used for V2V communication.

In FIG. 6a, third and ninth OFDM/SC-FDMA symbols in the subframe are used as a reference signal (RS). Further, in FIG. 6b, second, fifth, eighth, and eleventh OFDM/SC-FDMA symbols in the subframe are used as a reference signal (RS).

As shown in FIG. 6a and FIG. 6b, a transmission UE uses a first OFDM/SC-FDMA symbol expressed by Data® for transmission because of characteristic of a Sidelink. However, a reception UE uses the first OFDM/SC-FDMA symbol for Rx AGC. That is, the first OFDM/SC-FDMA symbol expressed by Data® is a symbol which may not be used for receiving real data in a baseband modem side of a reception UE.

Meanwhile, a final symbol expressed by Data, is used when the transmission UE performs channel coding, but is punctured not to be transmitted.

As described above, a sidelink for V2V communication uses a subframe structure having a form similar to that of the existing LTE/LTE-A-based PUSCH structure in terms of transmission and reception between UEs. According to the existing LTE/LTE-A, a hybrid automatic repeat request (HARQ) acknowledgement/negative-acknowledgement (ACK/NACK) signal for the transmission of a PUSCH by a UE may be forwarded. Likewise, an HARQ ACK/NACK signal needs to be transmitted with respect to a transmission signal through a sidelink. However, a current sidelink subframe structure, such as those shown in FIG. 6a and FIG. 6b, has a problem in that it does not support the transmission and reception of an ACK/NACK signal.

<Disclosure of this Specification>

Accordingly, in order to solve the above-described problem, the first disclosure of this specification proposes an improved subframe structure in order to support the transmission and reception of an HARQ ACK/NACK signal. Furthermore, the second disclosure proposes a scheme for mapping an HARQ ACK/NACK signal to a resource.

Hereinafter, V2V is chiefly described for convenience of description, but the following contents may also be applied to V2X and common D2D.

I. First Disclosure

Figure 7A:
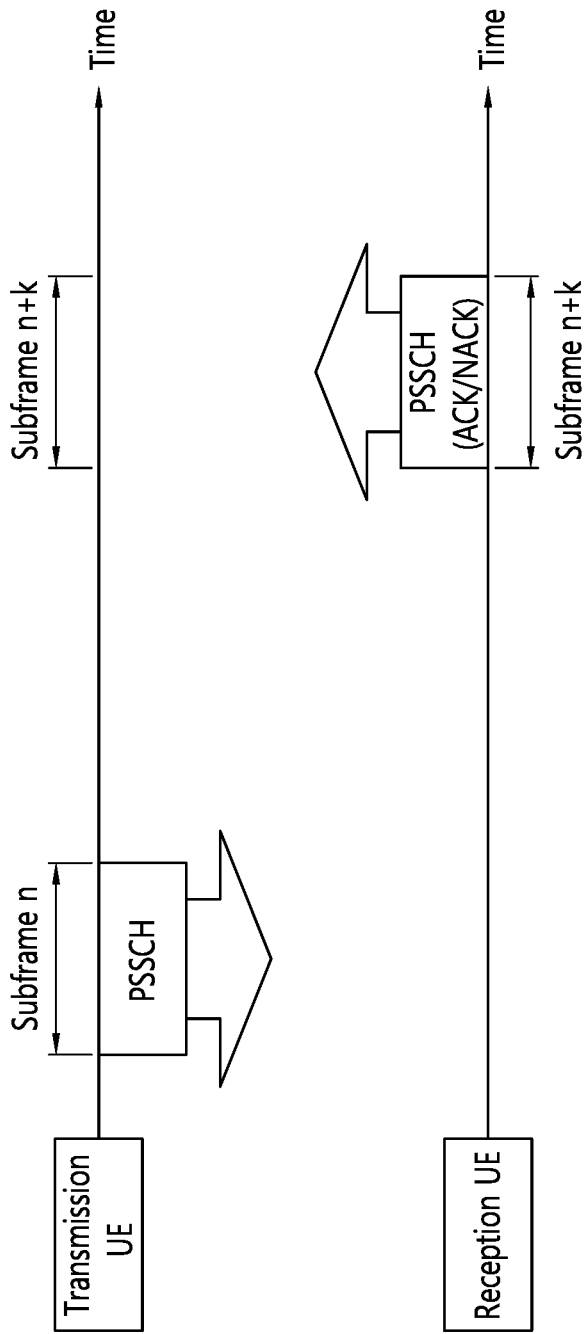
FIG. 7a shows an example in which an HARQ ACK/NACK signal is piggybacked and transmitted on a PSSCH.
Figure 7B:
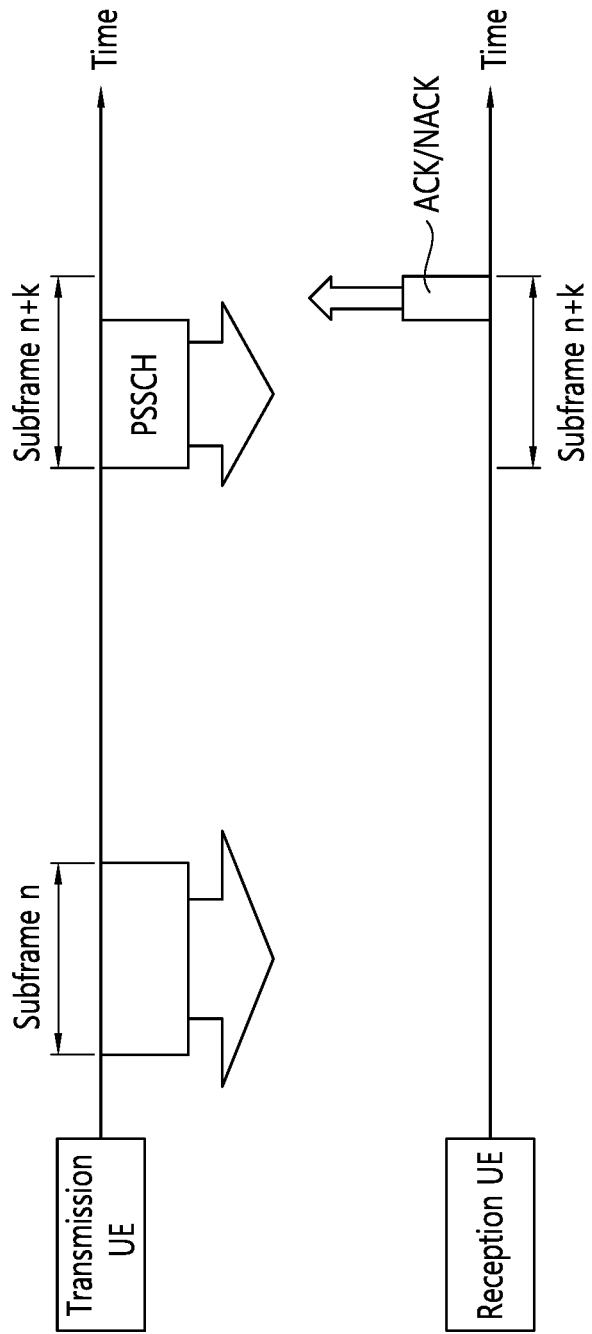
FIG. 7b shows an example in which an HARQ ACK/NACK signal is independently transmitted.

FIG. 7a shows an example in which an HARQ ACK/NACK signal is piggybacked and transmitted on a PSSCH, and FIG. 7b shows an example in which an HARQ ACK/NACK signal is independently transmitted.

As shown in FIG. 7a, if a transmission UE transmits first data through a PSSCH in a subframe n and a reception UE has second data to be transmitted through a PSSCH in a subframe n+k, the reception UE may piggyback and transmit an HARQ ACK/NACK signal on the PSSCH.

However, as shown in FIG. 7b, if the transmission UE tries to transmit the PSSCH on the subframe n+k in which the reception UE has to transmit the HARQ ACK/NACK signal (and if the reception UE does not have data to be transmitted through the PSSCH), the reception UE may transmit the HARQ ACK/NACK signal at the back part of the subframe n+k, and the transmission UE may transmit the data in a part except the back part of the subframe through the PSSCH.

In this case, after the reception UE receives the data through the PSSCH from the transmission UE in the part except the back part of the subframe n+k, it switches RX/TX and transmits a next HARQ ACK/NACK signal. In order to perform RX/TX switching as described above, a gap duration needs to be present within the subframe n+k.

Figure 8:
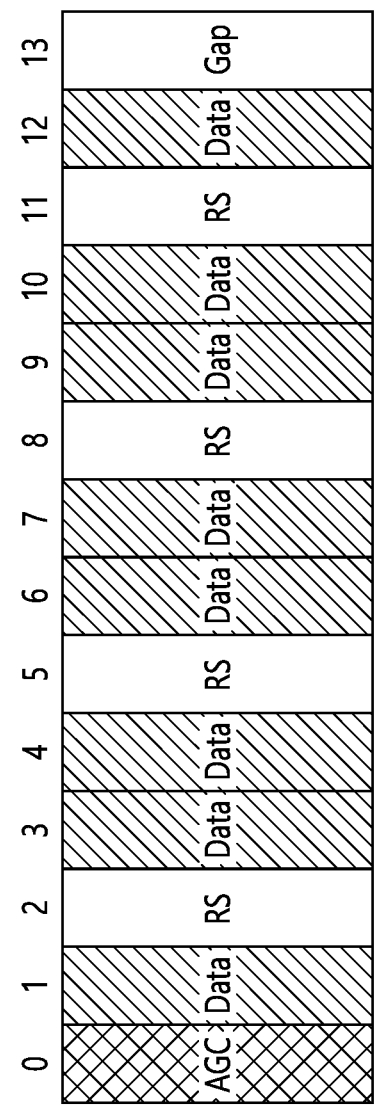
FIG. 8 an explanatory diagram showing one example of an improved sidelink subframe according to a first disclosure.

FIG. 8 an explanatory diagram showing one example of an improved sidelink subframe according to a first disclosure.

The subframe shown in FIG. 8 may be used to transmit a PSSCH on which an HARQ ACK/NACK signal has been piggybacked, as shown in FIG. 7a. A symbol 0 and a symbol 13 within the subframe shown in FIG. 8 are used for automatic gain control (AGC) and a gap, respectively. Furthermore, referring to the subframe shown in FIG. 8, one symbol for a data signal is positioned before and after one symbol for a reference signal (RS). That is, the reference signal (RS) is positioned between symbols for data signals. The RS may be used for the demodulation of the data signal. In this case, the RS may be called a demodulation reference signal (DMRS).

Meanwhile, the RS may be positioned in a different form. This is described with reference to FIG. 9.

Figure 9:
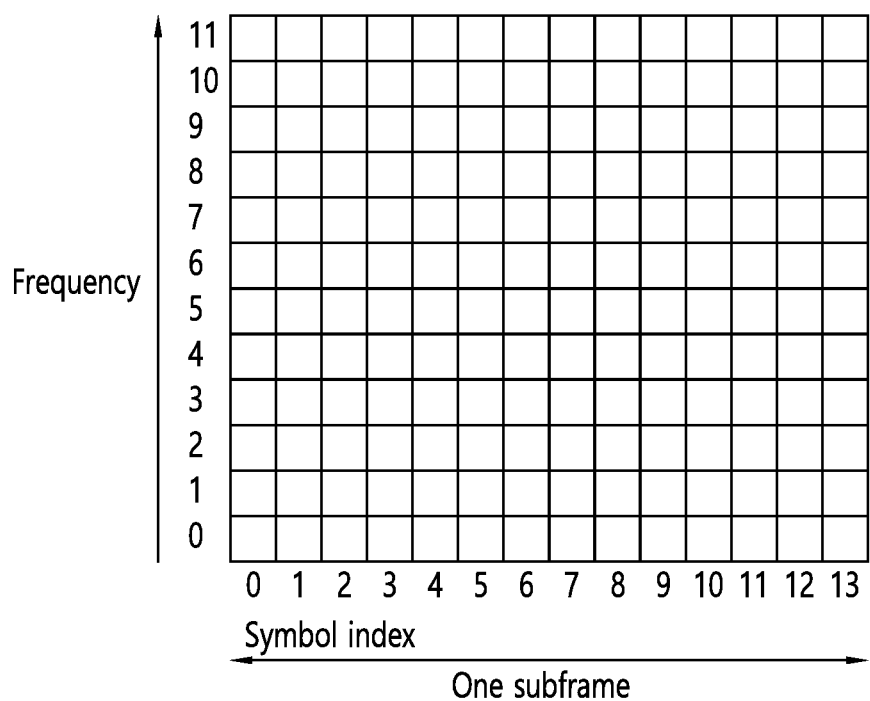
FIG. 9 is an explanatory diagram showing an example of a reference signal (RS) positioned within the improved sidelink subframe according to the first disclosure.

FIG. 9 is an explanatory diagram showing an example of a reference signal (RS) positioned within the improved sidelink subframe according to the first disclosure.

Referring to FIG. 9, the RS may be positioned in a horizontal direction (vertical direction in a frequency axis). As shown in FIG. 9, if the RS is positioned in the horizontal direction, there is an advantage in that it is easy to correct a frequency offset or a phase offset attributable to a Doppler shift, compared to the RS shown in FIG. 8. The RS shown in FIG. 9 is illustrative, and the number, position, form, etc. of an RS may be changed.

A phase tracking reference signal (PTRS) may be used as an example of an RS having a different form. The PTRS may be present in a form including a PTRS every n-th RB in a different form for each UE. Furthermore, a subframe structure having a form in which RS of various forms are mixed may be taken into consideration. Accordingly, in the illustrated drawings, symbols used for a data signal and an HARQ ACK/NACK signal may be applied to both a form including an RS in the frequency region and a form not including an RS in the frequency region.

Referring back to FIG. 8, if the symbol 0 for AGC and the symbol 13 for a gap are excluded, symbols 1~12 used for the transmission and reception of actual data may be classified into N subparts configured with data and an RS. For example, if three contiguous symbols configured in order of data, an RS and data are classified as one subpart, the symbols 1~12 region in which data transmission and reception are performed may be divided into a total of four subparts of the symbols 1~3, the symbols 4~6, the symbols 7~9, and the symbols 10~12. The symbols 1~12 region may be divided into N subparts through another combination with the above example.

As in the above example, assuming a subframe structure configured with AGC (symbol0), a subpart0, a subpart1, . . . , a subpart (N−1), and a gap (symbol13), one or a plurality of subparts at a given position may be used for a duration for an HARQ ACK/NACK signal. In this case, FIG. 8 shows that the gap duration occupies the entire time duration of the symbol 13, but the gap duration may be smaller than one symbol duration. For example, the gap duration may be changed into a half-symbol duration. Furthermore, two gap durations, each one having the half-symbol duration, may be positioned before and after a duration, including an HARQ ACK/NACK signal and an RS for the HARQ ACK/NACK signal (hereinafter referred to as an HARQ-RS or HARQ-DMRS), respectively, so that they are used for time for TX/RX switching.

If a DMRS is used in the propose subframe structure, an RS neighboring a data signal (hereinafter a Data-RS) may be positioned to be present in a time-equal manner basically. Furthermore, the Data-RS and the HARQ-RS may be used for the demodulation of the data signal and the demodulation of the HARQ ACK/NACK signal, respectively.

Meanwhile, FIGS. 10 to 18 show subframe structures for an example in which the reception UE transmits an HARQ ACK/NACK signal at the back part of the subframe n+k and the transmission UE transmits data through a PSSCH in a part except the back part of the subframe, as shown in FIG. 7*b*.

Figure 10:
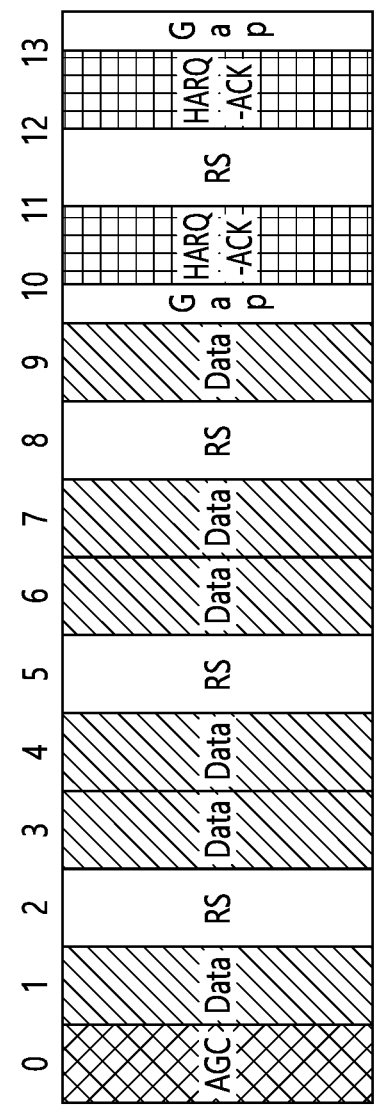
FIG. 10 is an explanatory diagram showing an example A of the structure of the improved sidelink subframe according to the first disclosure.

FIG. 10 is an explanatory diagram showing an example A of the structure of the improved sidelink subframe according to the first disclosure.

According to the example A shown in FIG. 10, S contiguous symbols may be classified as one subpart. In this case, one or a plurality of subparts may include a duration for an HARQ ACK/NACK signal. Furthermore, two gap durations, each one having a half-symbol size, are positioned before and after the HARQ ACK/NACK signal duration. A U may RX/TX-switch in the gap duration. Alternatively, an AGC operation may be performed in the former gap duration. As in FIG. 8, the subpart may include contiguous three symbols in order of data, an RS, and data. Furthermore, one subpart positioned in the symbols 10-12 may be changed into a duration for an HARQ ACK/NACK signal. Two gap durations, each one having a half-symbol size, may be positioned before and after the subpart. A UE may RX/TX-switch in the gap duration positioned in the No. 10, 13 symbol, and may perform an AGC operation in the gap duration positioned in the No. 10 symbol. Meanwhile, a PTRS, such as that shown in FIG. 9, may be used or a form in which a DMRS and a PTRS have been mixed may be used instead of the illustrated RS. If an RS of a different form is used as described above, data may be included instead of a data-RS and an HARQ ACK/NACK signal may be included instead of an HARQ-RS in a corresponding symbol shown in FIG. 10.

Figure 11:
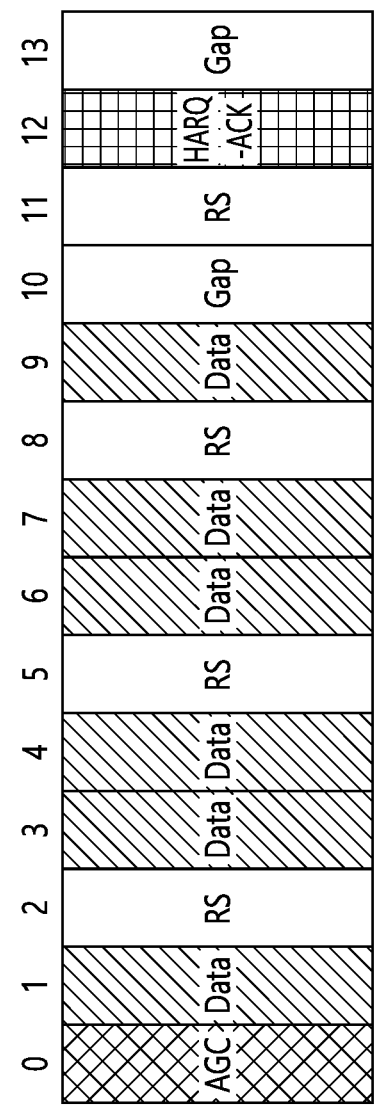
FIG. 11 is an explanatory diagram showing an example B-1 of the structure of the improved sidelink subframe according to the first disclosure.

FIG. 11 is an explanatory diagram showing an example B-1 of the structure of the improved sidelink subframe according to the first disclosure.

Referring to FIG. 11, some of symbols present in a subpart used for an HARQ ACK/NACK signal duration may be used for other purposes. (S-1) symbols of the S symbols of one or a plurality of subparts are used for an HARQ ACK/NACK signal or RS duration, and a gap having one symbol size is positioned before and after a corresponding duration. A UE may perform RX/TX switching in a gap duration. A former gap duration may be used for an AGC operation. If a gap having one symbol size is positioned as described above, there is an advantage in that an AGC or RX/TX switching time can be sufficiently secured compared to the case where a gap having a half-symbol size is positioned. In FIG. 11, the position of the HARQ ACK/NACK signal duration and the position of a neighboring RS duration may be exchanged. A UE may perform RX/TX switching in a gap duration of a half-symbol size positioned in a No. 10, 13 symbol, and may perform an AGC operation in the gap duration positioned in the No. 10 symbol. Meanwhile, a PTRS, such as that shown in FIG. 9, may be used or a form in which a DMRS and a PTRS have been mixed may be used instead of the illustrated RS. If an RS of a different form is used as described above, data may be included instead of a data-RS and an HARQ ACK/NACK signal may be included instead of an HARQ-RS in a corresponding the symbol shown in FIG. 11.

Figure 12:
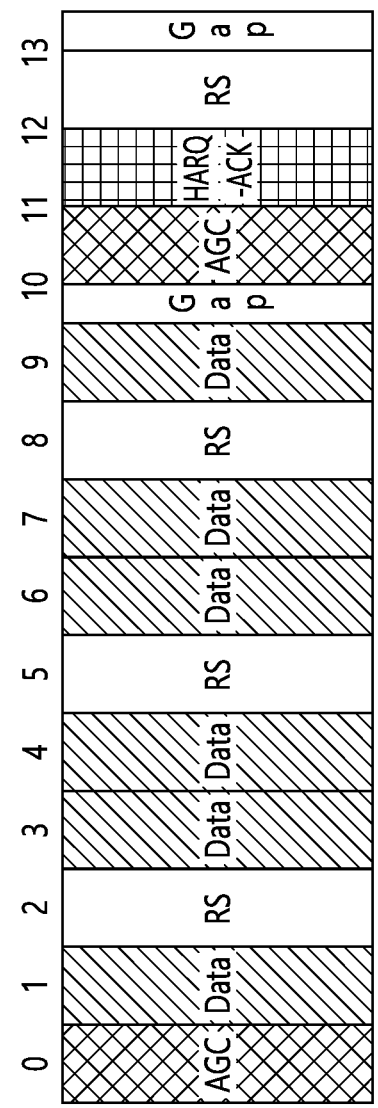
FIG. 12 is an explanatory diagram showing an example B-2 of the structure of the improved sidelink subframe according to the first disclosure.

FIG. 12 is an explanatory diagram showing an example B-2 of the structure of the improved sidelink subframe according to the first disclosure.

Referring to the example B-2 shown in FIG. 12, (S-1) symbols of the S symbols of one or a plurality of subparts are used for an HARQ ACK/NACK signal or RS duration, and a gap having a half-symbol size is positioned before and after a corresponding duration. In this case, a different operation may be additionally performed during the remaining one symbol duration. For example, AGC may be additionally configured during one symbol duration or AGC may be configured during the duration of a half-symbol size, and a different operation, such as an HARQ ACK/NACK signal or an RS, may be additionally configured during the duration of another half-symbol size. Alternatively, AGC may be configured in a duration having a half-symbol size, and a second gap duration may be configured to be longer than the duration having a half-symbol size. A UE may RX/TX-switch in the gap duration, and may perform an AGC operation in the former gap duration. If AGC is added and used during the duration of one symbol size, there is an advantage in that an AGC or RX/TX switching time can be sufficiently secured through the first gap duration and the second AGC duration. Referring to the structure of the example B-2 shown in FIG. 12, a gap duration having a half-symbol size is positioned before and after a region including an HARQ ACK/NACK signal, as in FIG. 10. A difference from FIG. 10 is that one symbol is used for AGC in the example B-2 shown in FIG. 12. Meanwhile, unlike in that shown in FIG. 12, the position of the HARQ ACK/NACK signal and the position of a neighboring RS duration may be exchanged. A UE may RX/TX-switch in the gap duration of a half-symbol size positioned in the No. 10, 13 symbol, and may perform an AGC operation in the gap duration positioned in the No. 10 symbol. Meanwhile, a PTRS, such as that shown in FIG. 9, may be used or a form in which a DMRS and a PTRS have been mixed may be used instead of the illustrated RS. If an RS of a different form is used as described above, data may be included instead of a data-RS and an HARQ ACK/NACK signal may be included instead of an HARQ-RS in a corresponding symbol shown in FIG. 12.

Figure 13:
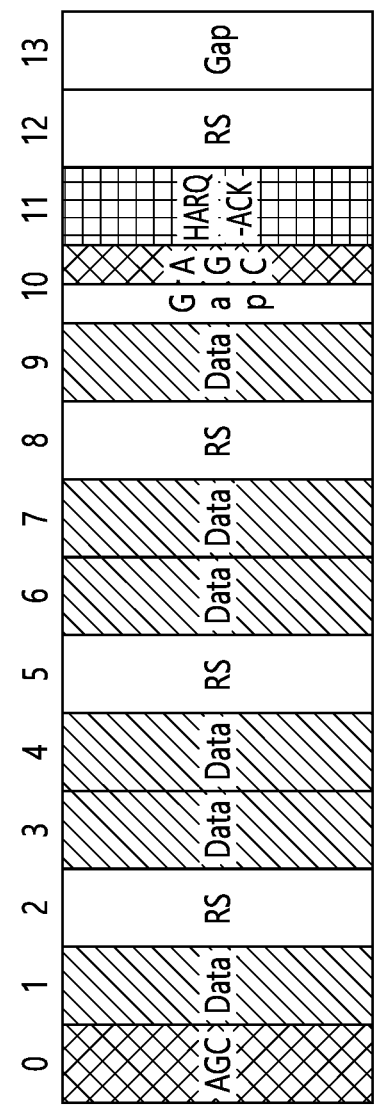
FIG. 13 shows a modified example of the example B-2 shown in FIG. 12.

FIG. 13 shows a modified example of the example B-2 shown in FIG. 12.

Referring to the modified example shown in FIG. 13, as in FIG. 10, a gap duration having a half-symbol size may be positioned before a subpart including an HARQ ACK/NACK signal. A difference from FIG. 10 is that a duration having a half-symbol size is used for AGC and a second gap duration is configured in one symbol. Meanwhile, unlike in that shown in FIG. 13, the position of the HARQ ACK/NACK signal and the position of a neighboring RS duration may be exchanged. A UE may RX/TX-switch in a gap duration positioned in a No. 10, 13 symbol, and may perform an AGC operation in the gap duration positioned in the No. 10 symbol. Meanwhile, a PTRS, such as that shown in FIG. 9, may be used or a form in which a DMRS and a PTRS have been mixed may be used instead of the illustrated RS. If an RS of a different form is used as described above, data may be included instead of a data-RS and an HARQ ACK/NACK signal may be included instead of an HARQ-RS in a corresponding symbol shown in FIG. 13.

According to the example A, the example B-1, and the example B-2, a reception UE can demodulate an HARQ ACK/NACK signal by performing channel estimation and compensation through an RS of various forms. However, a subframe structure for transmitting an HARQ ACK/NACK signal in the form of one sequence so that an RS for the demodulation of the HARQ ACK/NACK signal is not necessary is described below. According to such a structure, more resources can be used for a duration for an HARQ ACK/NACK signal because an HARQ-RS duration does not need to be separately present.

Figure 14:
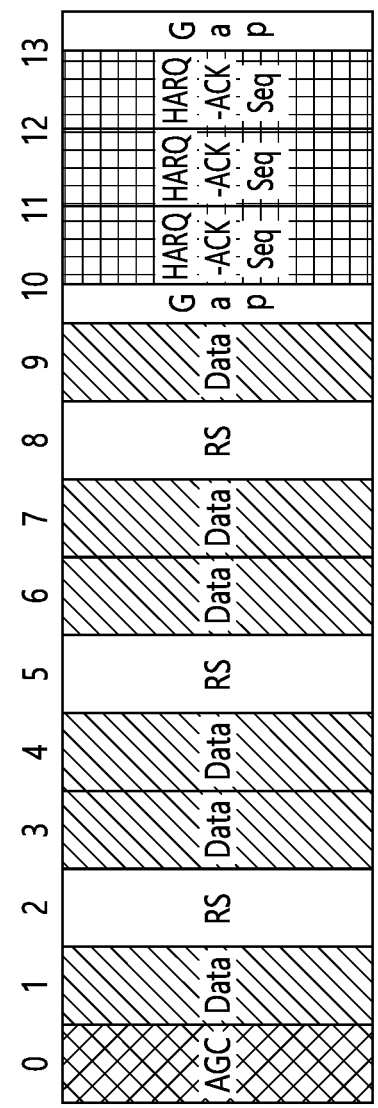
FIG. 14 is an explanatory diagram showing an example C-1 of the structure of the improved sidelink subframe according to the first disclosure.

FIG. 14 is an explanatory diagram showing an example C-1 of the structure of the improved sidelink subframe according to the first disclosure.

According to the example C-1 shown in FIG. 14, after S contiguous symbols are classified as one subpart, one or a plurality of subparts is allocated as a duration for an HARQ ACK/NACK signal sequence. Furthermore, two gap durations, each one having a half-symbol size, are positioned before and after a corresponding one subpart or a plurality of corresponding subparts. FIG. 14 is described by comparing it with FIG. 10. The HARQ ACK/NACK signal and the neighboring RS shown in FIG. 10 may be substituted with an HARQ ACK/NACK signal sequence as in FIG. 14. A UE may RX/TX-switch in the gap duration and may perform an AGC operation in the former gap duration. In this case, more resources can be used for a duration for an HARQ ACK/NACK signal compared to the example A because an HARQ ACK/NACK signal and an HARQ-RS are substituted with a single HARQ ACK/NACK signal sequence. Meanwhile, a PTRS, such as that shown in FIG. 9, may be used or a form in which a DMRS and a PTRS have been mixed may be used instead of the illustrated RS. If an RS of a different form is used as described above, data may be included instead of a data-RS and an HARQ ACK/NACK signal may be included instead of an HARQ-RS in a corresponding symbol shown in FIG. 14.

Figure 15:
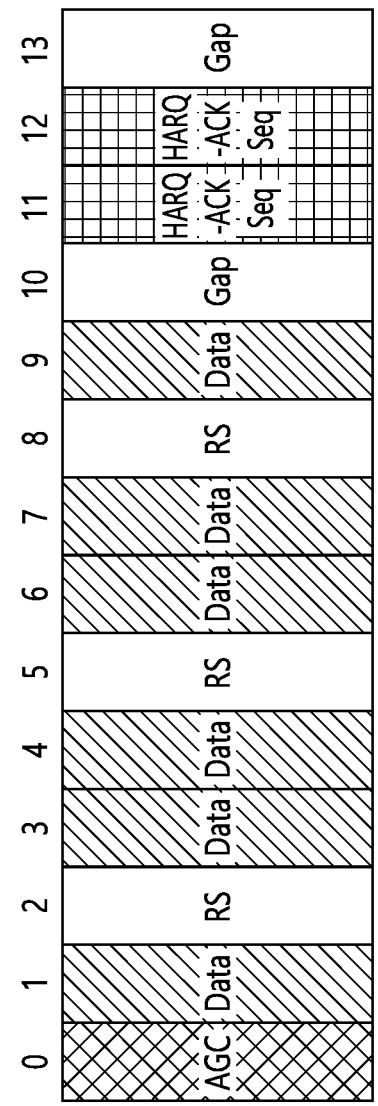
FIG. 15 is an explanatory diagram showing an example C-2 of the structure of the improved sidelink subframe according to the first disclosure.

FIG. 15 is an explanatory diagram showing an example C-2 of the structure of the improved sidelink subframe according to the first disclosure.

Referring to the example C-2 shown in FIG. 15, (S-1) symbols of the S symbols of one or a plurality of subparts may be used for an HARQ ACK/NACK signal sequence duration, and a gap having a duration of one symbol size may be positioned before and after the corresponding duration. FIG. 15 is described by comparing it with FIG. 15. The HARQ ACK/NACK signal and the neighboring RS shown in FIG. 11 may be substituted with a single HARQ ACK/NACK signal sequence in FIG. 15. A UE may RX/TX-switch in the gap duration, and may perform an AGC operation in the former gap duration. Accordingly, there is an advantage in that an AGC or RX/TX switching time can be sufficiently secured compared to the case where a gap having a half-symbol size is positioned. Meanwhile, a PTRS, such as that shown in FIG. 9, may be used or a form in which a DMRS and a PTRS have been mixed may be used instead of the illustrated RS. If an RS of a different form is used as described above, data may be included instead of a data-RS and an HARQ ACK/NACK signal may be included instead of an HARQ-RS in a corresponding symbol shown in FIG. 15.

Figure 16:
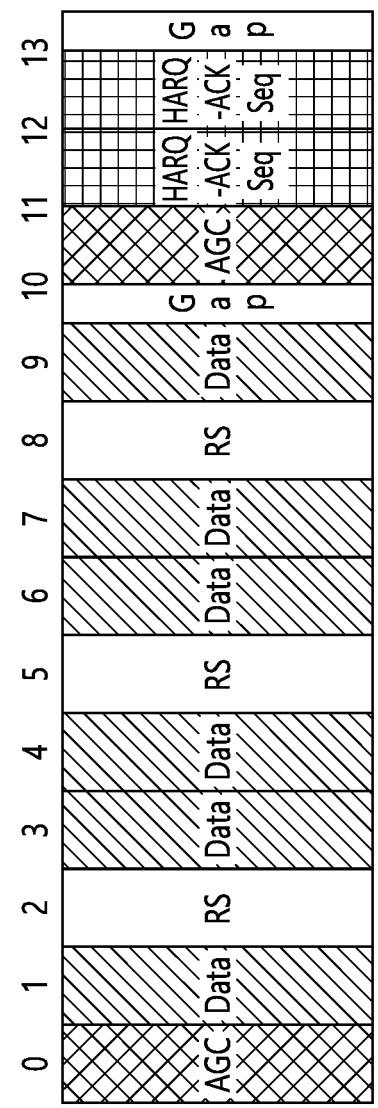
FIG. 16 is an explanatory diagram showing an example C-3 of the structure of the improved sidelink subframe according to the first disclosure.

FIG. 16 is an explanatory diagram showing an example C-3 of the structure of the improved sidelink subframe according to the first disclosure.

Referring to the example C-3 shown in FIG. 15, (S-1) symbols of the S symbols of one or a plurality of subparts may be used for an HARQ ACK/NACK signal sequence duration, and a gap having a half-symbol size may be positioned before and after the corresponding duration. In this case, another operation may be additionally performed during a duration of the remaining one symbol size. For example, AGC may be additionally configured during the duration of one symbol size, AGC of a duration having a half-symbol size may be positioned, and another operation, such as the transmission of an HARQ ACK/NACK signal and an RS, may be additionally performed during the duration of another half-symbol size. Alternatively, AGC may be configured within the duration having a half-symbol size, and a second gap duration may be configured to have a size longer than the duration of a half-symbol size. If AGC is added and used during the duration of one symbol size, there is an advantage in that an AGC or RX/TX switching time can be sufficiently secured through the first gap duration and the second AGC duration. FIG. 16 is described by comparing it with FIG. 12. The HARQ ACK/NACK signal and the neighboring RS shown in FIG. 12 may be substituted with a single HARQ ACK/NACK signal sequence as in FIG. 16. A UE may RX/TX-switch in a gap duration having a half-symbol size disposed in a No. 10, 13 symbol, and may perform an AGC operation in the gap duration positioned in the No. 10 symbol. Meanwhile, a PTRS, such as that shown in FIG. 9, may be used or a form in which a DMRS and a PTRS have been mixed may be used instead of the illustrated RS. If an RS of a different form is used as described above, data may be included instead of a data-RS and an HARQ ACK/NACK signal may be included instead of an HARQ-RS in a corresponding symbol shown in FIG. 16.

Figure 17:
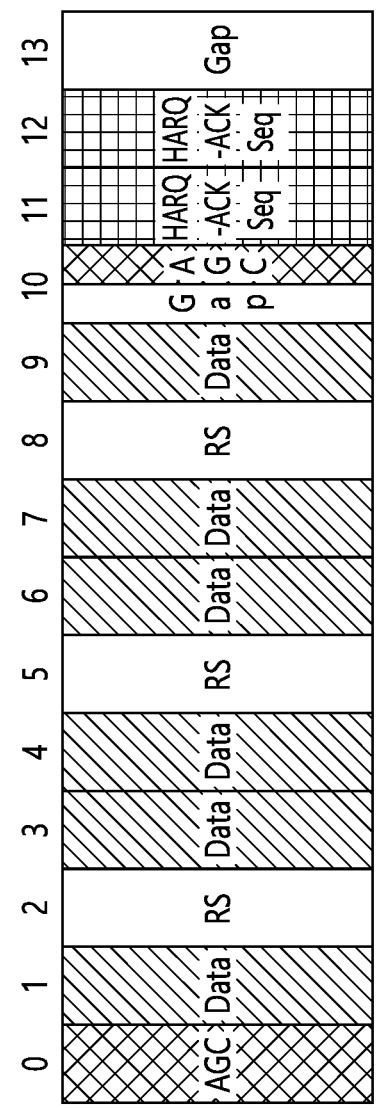
FIG. 17 shows a modified example of the example C-3 shown in FIG. 16.

FIG. 17 shows a modified example of the example C-3 shown in FIG. 16.

Referring to FIG. 17 by comparing it with FIG. 13, the HARQ ACK/NACK signal and the neighboring RS shown in FIG. 13 may be substituted with a single HARQ ACK/NACK signal sequence as in FIG. 17. A UE may RX/TX-switch in a gap duration having a half-symbol size positioned in a No. 10, 13 symbol, and may perform an AGC operation in the gap duration positioned in the No. 10 symbol. Meanwhile, a PTRS, such as that shown in FIG. 9, may be used or a form in which a DMRS and a PTRS have been mixed may be used instead of the illustrated RS. If an RS of a different form is used as described above, data may be included instead of a data-RS and an HARQ ACK/NACK signal may be included instead of an HARQ-RS in a corresponding symbol shown in FIG. 17.

Figure 18:
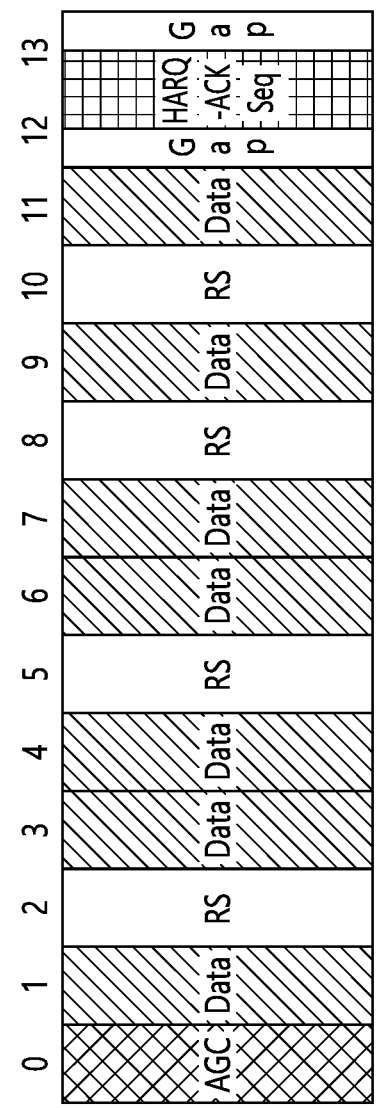
FIG. 18 is an explanatory diagram showing an example C-4 of the structure of the improved sidelink subframe according to the first disclosure.

FIG. 18 is an explanatory diagram showing an example C-4 of the structure of the improved sidelink subframe according to the first disclosure.

Referring to the example C-4 of FIG. 18, only one of the symbols of one subpart may be used for an HARQ ACK/NACK signal sequence duration, and a gap having one symbol or a half-symbol size may be positioned before and after the corresponding duration. A UE may RX/TX-switch in the gap duration, and may perform an AGC operation in the former gap duration. In this case, there is an advantage in that a subframe structure can be changed while a loss of a resource used for data transmission is minimized because the remaining duration of a subpart is used for data transmission. Meanwhile, a PTRS, such as that shown in FIG. 9, may be used or a form in which a DMRS and a PTRS have been mixed may be used instead of the illustrated RS. If an RS of a different form is used as described above, data may be included instead of a data-RS and an HARQ ACK/NACK signal may be included instead of an HARQ-RS in a corresponding symbol shown in FIG. 18.

The example A, the example B (including the examples B-1 to B-2), and the example C (including the examples C-1 to C-4) may be identically applied to the case where an HARQ ACK/NACK signal is transmitted after data is transmitted in addition to the case where an HARQ ACK/NACK signal is transmitted after data is received within one subframe of a UE. If data and an HARQ ACK/NACK signal are consecutively transmitted, only an AGC operation may be performed in the first gap duration (No. 10 symbol position) having one symbol or a half-symbol size present in the last subpart, and RX/TX-switching may be performed in the second gap duration (No. 13 symbol position). Assuming the structure of FIG. 14, an AGC operation may be performed during the gap duration having the first half-symbol size, and an RX/TX switching operation may be performed during the duration having the second half-symbol size. In this case, an HARQ ACK/NACK signal may be transmitted in the form of one sequence so that an RS for the demodulation of the HARQ ACK/NACK signal is not necessary additionally. The HARQ ACK/NACK signal may be piggybacked and transmitted within a data signal when data is transmitted.

II. Second Disclosure

According to the example A, the example B (including the examples B-1 to B-2), and the example C (including the examples C-1 to C-4), there is a disadvantage in that overhead of AGC may increase because AGC is necessary for each of data and an HARQ ACK/NACK signal. Accordingly, data and an HARQ ACK/NACK signal are not split within one subframe, but data and an HARQ ACK/NACK signal may be split the entire resource pool.

Figure 19A:
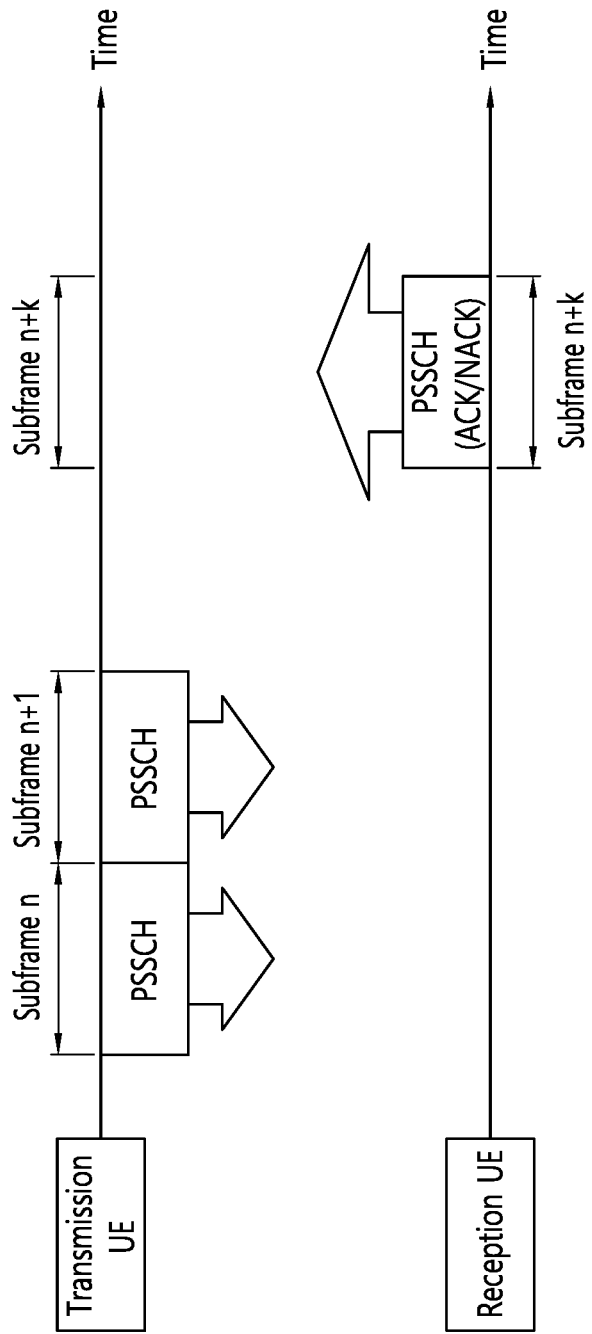
FIGS. 19*a* and 19*b* show examples in which an HARQ ACK/NACK signal is transmitted.
Figure 19B:
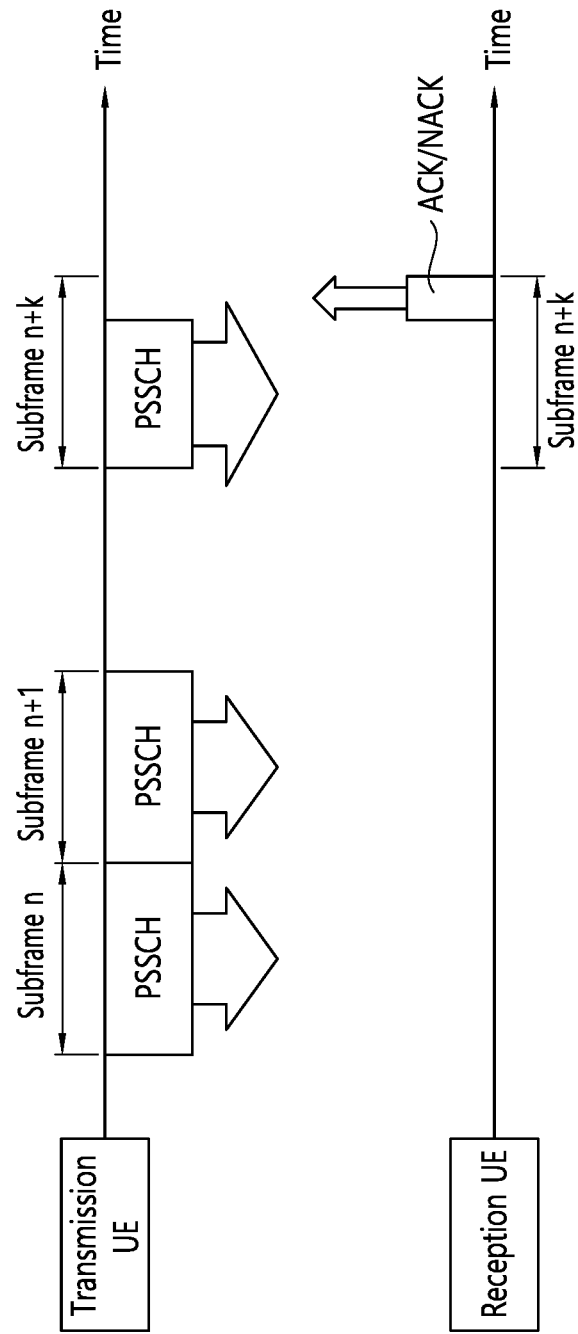

FIGS. 19a and 19b show examples in which an HARQ ACK/NACK signal is transmitted.

As shown in FIG. 19a, a reception UE may receive two data through PSSCHs on a subframe n and a subframe n+1 from a transmission UE. Accordingly, the reception UE may transmit ACK/NACK signals for the two data on a subframe n+k.

Alternatively, as shown in FIG. 19b, a reception UE may receive two data through PSSCHs on a subframe n and a subframe n+1 from a transmission UE. In this case, if the transmission UE tries to transmit a PSSCH on a subframe n+k on which the reception UE has to transmit an HARQ ACK/NACK signal (and if the reception UE does not have data to be transmitted through the PSSCH), the reception UE may transmit ACK/NACK signals for the two data at the back part of the subframe n+k, and the transmission UE may transmit data through the PSSCH in a part except the back part of the subframe.

As described above, a plurality of HARQ ACK/NACK signals for a plurality of reception data may be transmitted on a single subframe. In this case, there is a need for a scheme for efficiently mapping the plurality of HARQ ACK/NACK signals to a time/frequency resource within the subframe. Furthermore, the position of the time/frequency resource needs to be recognized by both a transmission UE and a reception UE.

Hereinafter, there is proposed a scheme for mapping an HARQ ACK/NACK signal position for each datum of a specific transmission unit if HARQ ACK/NACK signals are to be transmitted and received in order to improve reliability of a sidelink for V2V communication. Furthermore, there is proposed a scheme for indicating a resource position to which an HARQ ACK/NACK signal has been mapped. In this case, a sidelink resource defined by a time/frequency may be divided in a specific transmission unit of data. Furthermore, an HARQ ACK/NACK signal may be mapped to the divided sidelink resource. The specific transmission unit of data means a modified form or combined form of the time/frequency units defined in the existing communication standard or all time/frequency units that may be newly defined, in addition to the time/frequency units defined in the existing communication standard.

In the following example, if a resources of a specific unit is divided into contiguous time durations, the resource may be divided into 1, 2, . . . , N, 2N-th time resources. In this case, the N-th time resource means a duration in which an HARQ ACK/NACK signal may be present. The 2N-th time resource means a duration in which an HARQ ACK/NACK signal may be first present after the N-th time resource and an HARQ ACK/NACK signal presence duration contiguous to the N-th time resource, that is, the first duration of the second HARQ ACK/NACK signal presence duration. In this case, the time resources represented as N, N+1, N+2, . . . , 2N are merely an expression of a flow of contiguous times, and the position of actual 2N is not fixed. That is, N+N=2N is always established, and the position of 2N may be present in every place of N+1, N+2, N+3, . . . represented as time after N.

If a sidelink time/frequency resource present in contiguous times are divided and represented in a given time/frequency unit, a scheme for mapping an HARQ ACK/NACK signal resource for each data resource of a specific unit is described below. In the following drawings, a scheme for mapping an HARQ ACK/NACK signal to a time/frequency resource based on a data signal has been expressed. In this case, it is to be noted that the accompanying drawing shows only an example and an actual HARQ ACK/NACK signal may be mapped to some region or the entire region of the time/frequency resource unlike in that shown in the drawing.

FIGS. 20 to 47 show examples in which an HARQ ACK/NACK signal for received data is mapped according to a second disclosure.

Figure 20:
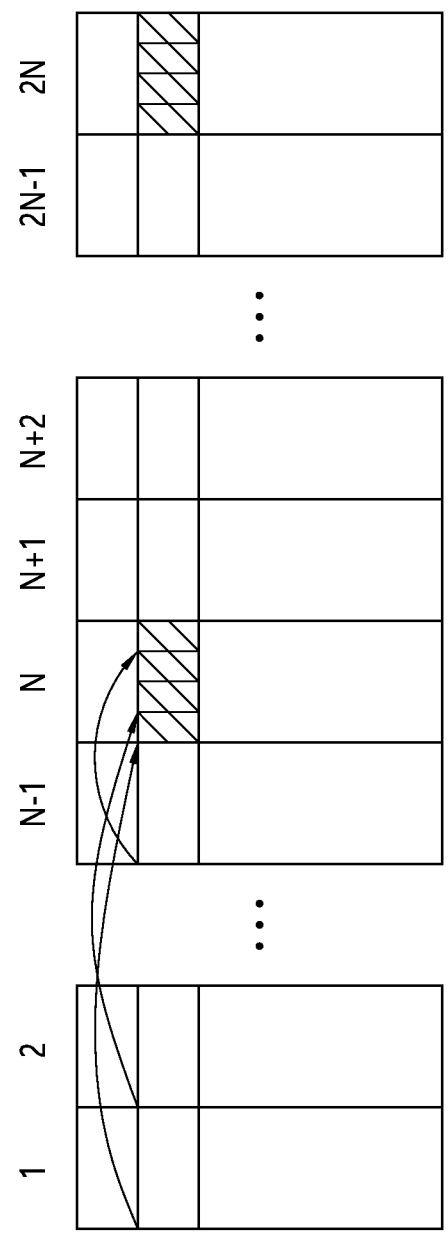
FIGS. 20 to 47 show examples in which an HARQ ACK/NACK signal for received data is mapped according to a second disclosure.

As shown in FIG. 20, an HARQ ACK/NACK signal for two data signals present in the two time resources of a specific frequency position may be mapped to the same frequency resource present in an N-th time resource.

Figure 21:
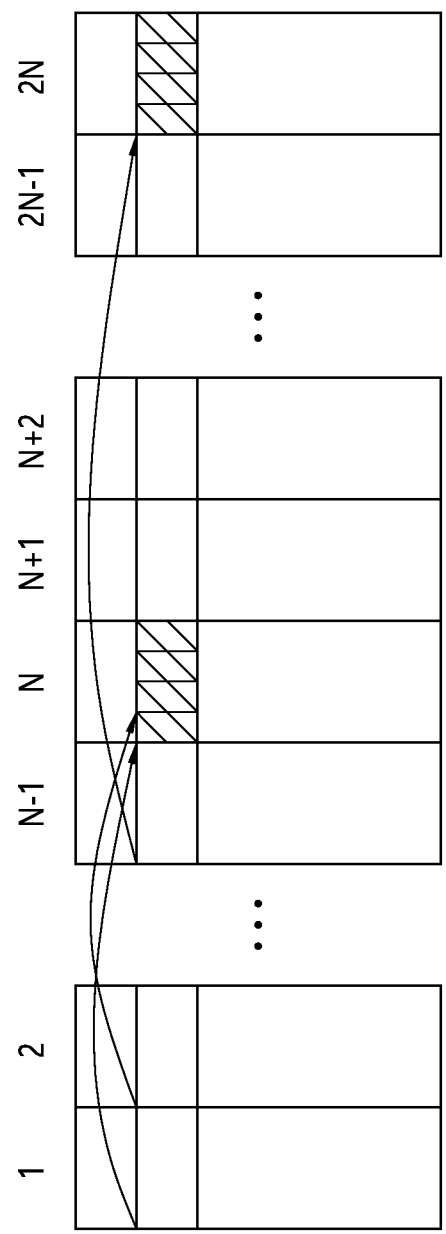

Alternatively, as shown in FIG. 21, an HARQ ACK/NACK signal for two data signals present in the two time resources of a specific frequency position may be mapped to the N-th and 2N-th time resource at the same frequency resource position.

Figure 22:
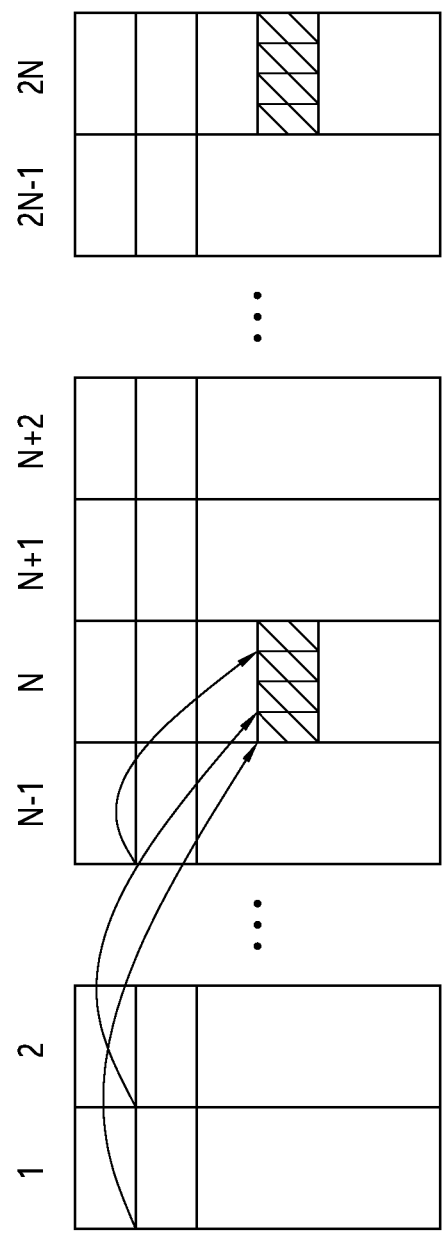

Alternatively, as shown in FIG. 22, a plurality of HARQ ACK/NACK signals for a plurality of data signals present in the first to (N−1)-th time resources of a specific frequency position may be mapped to the N-th time resource of a different frequency resource position.

Figure 23:
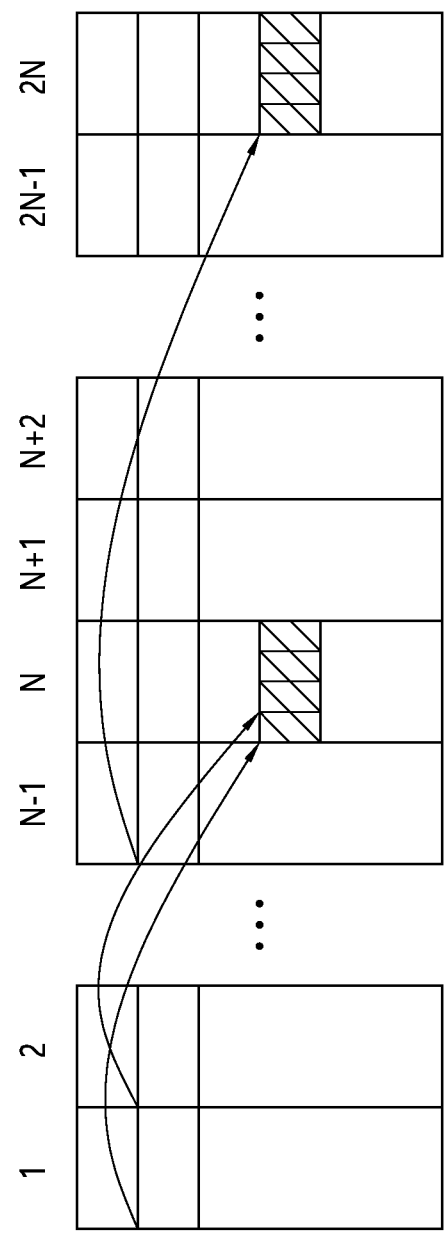

Alternatively, as shown in FIG. 23, HARQ ACK/NACK signals for a plurality of data signals present in a time resource prior to an (N−1)-th time (i.e., (N−2)-th) from the first time of a specific frequency position may be mapped to the N-th time resource of a different frequency resource position. In this case, an HARQ ACK/NACK signal for a data signal present in the (N−1)-th time resource may be mapped to a 2N-th time resource at a different frequency resource position.

Figure 24:
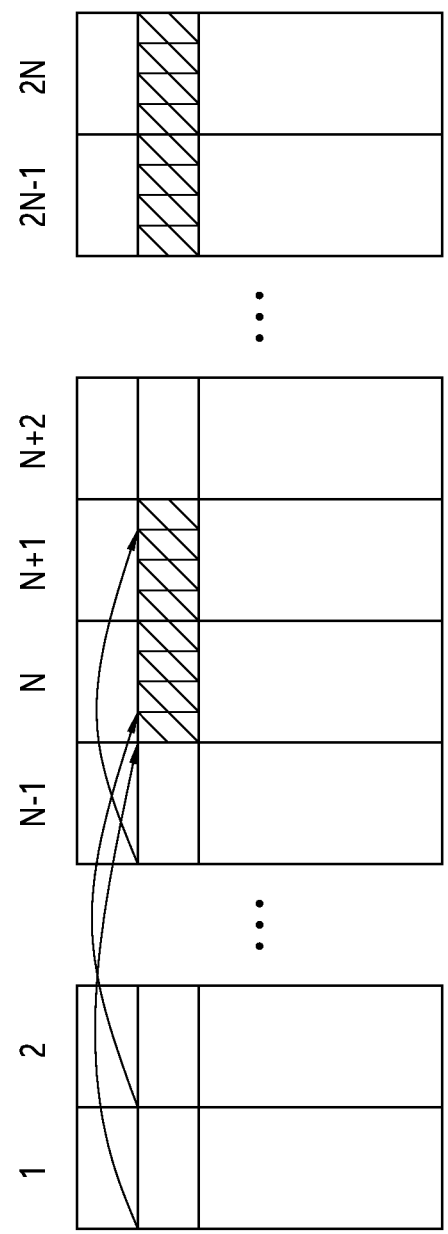
Figure 25:
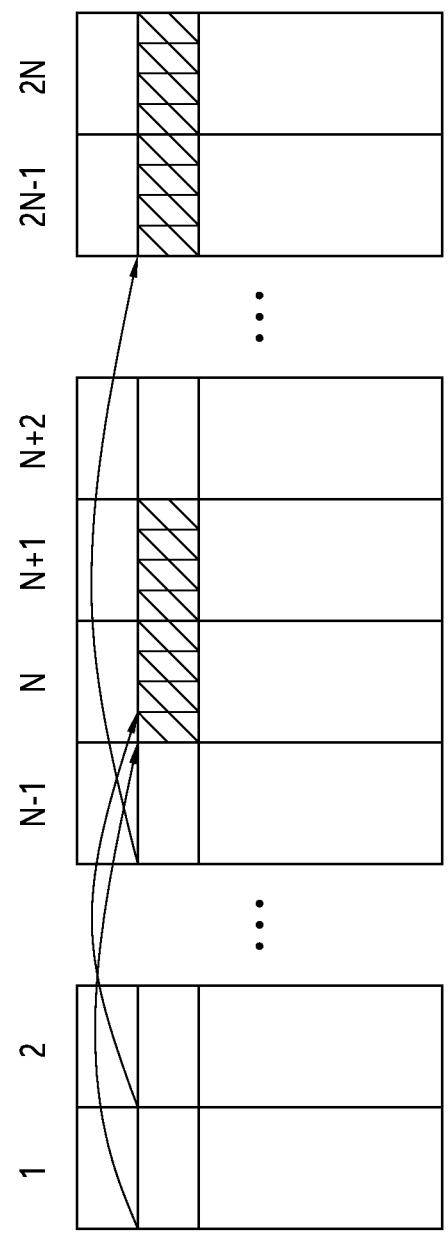

Meanwhile, as shown in FIGS. 24 to 25, a plurality of resources for an HARQ ACK/NACK signal may be present starting from an N-th time resource.

In this case, as shown in FIG. 24, HARQ ACK/NACK signals for a plurality of data signals present in the first to (N−1)-th time resources of a specific frequency position may be mapped to the N-th time resource to (N+n)-th time resource of the same frequency position. In this case, FIG. 24 shows a case where n=1.

Alternatively, as shown in FIG. 25, HARQ ACK/NACK signals for a plurality of data signals present in time resources prior to an (N−1)-th (i.e., (N−2)-th) from the first time resource of a specific frequency position may be mapped to the N-th time to (N+n)-th time resource of the same frequency position. Furthermore, an HARQ ACK/NACK signal for a data signal present in an (N−1)-th time resource may be mapped to the 2N-th to (2N+n)-th time resources of the same frequency resource position. In this case, FIG. 25 shows a case where n=1.

Figure 26:
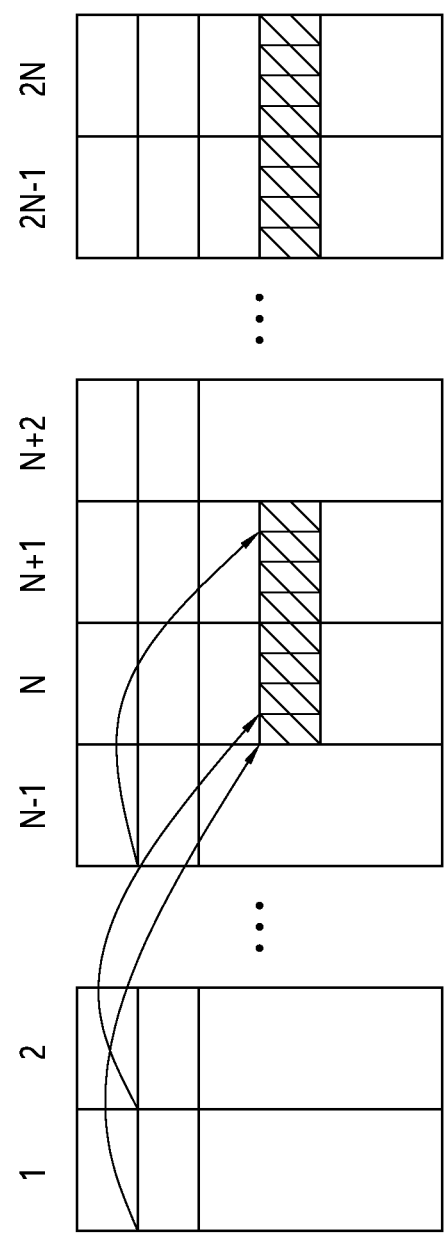
Figure 27:
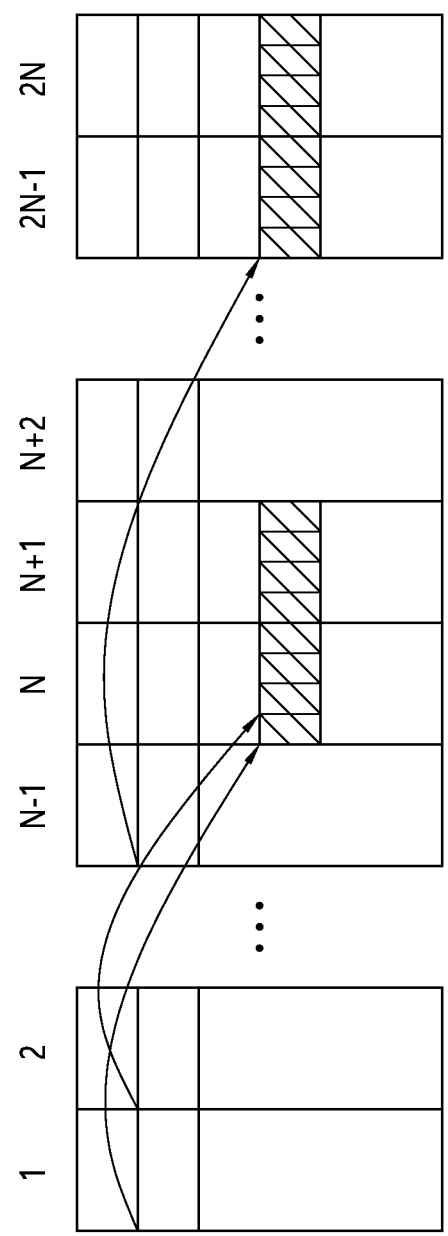

Meanwhile, as shown in FIGS. 26 and 27, a plurality of resources for an HARQ ACK/NACK signal may be present from the N-th time resource of a different frequency position.

First, as shown in FIG. 26, HARQ ACK/NACK signals for a plurality of data signals present in an (N−1)-th time resource from the first time resource of a specific frequency position may be mapped to an (N+n)-th time resource from the N-th time resource of a different frequency position. In this case, FIG. 26 shows a case where n=1.

Alternatively, as shown in FIG. 27, HARQ ACK/NACK signals for a plurality of data signals present in a time resource prior to an (N−1)-th (i.e., (N−2)-th) time resource from the first time resource of a specific frequency position may be mapped to an (N+n)-th time resource from the N-th time resource of a different frequency position. Furthermore, an HARQ ACK/NACK signal for a data signal present in an (N−1)-th time resource may be mapped to a (2N+n)-th time resource from the 2N-th time resource of a different frequency resource position. In this case, FIG. 27 shows a case where n=1.

Figure 28:
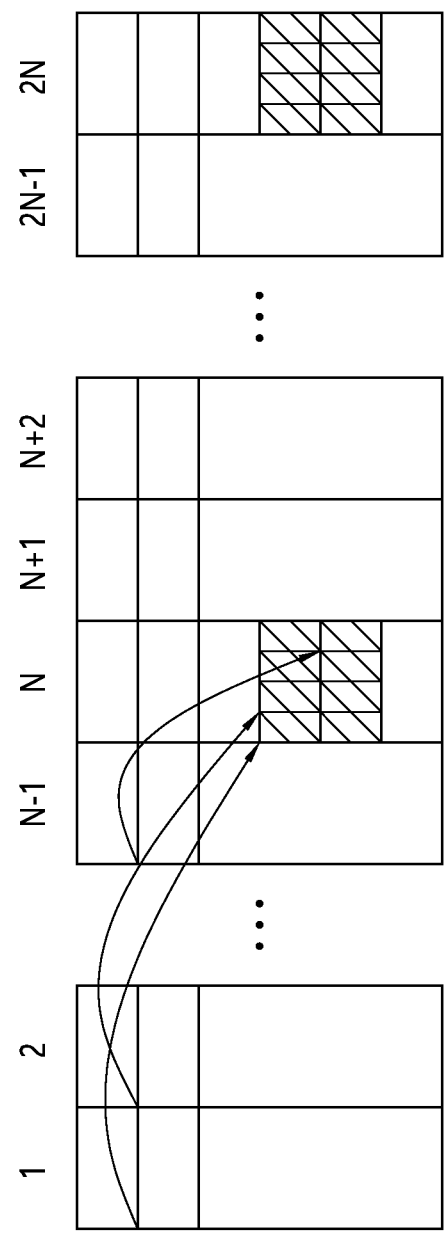
Figure 29:
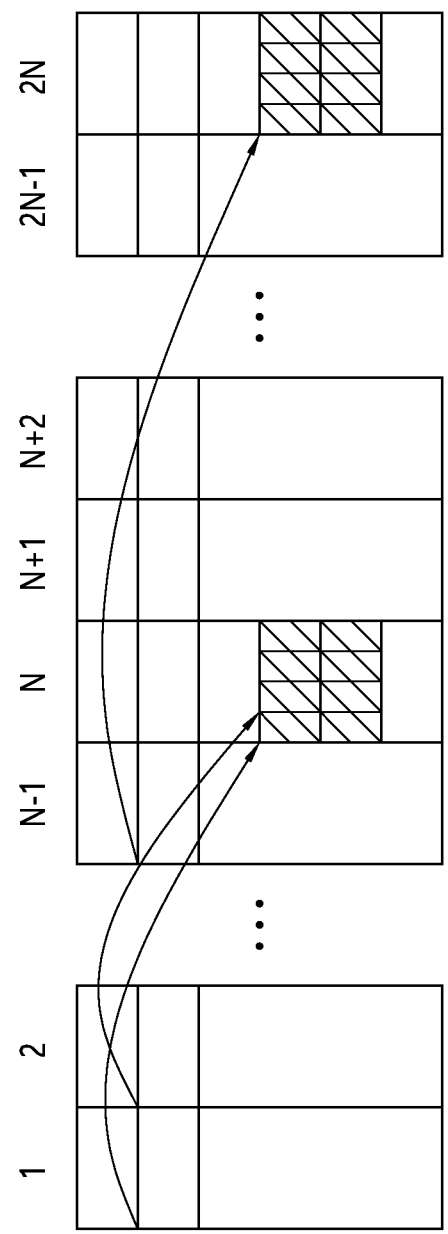

Meanwhile, as shown in FIGS. 28 and 29, a frequency resource for an HARQ ACK/NACK signal may be present contiguously or discontiguously.

First, as shown in FIG. 28, HARQ ACK/NACK signals for a plurality of data signals present in the first to (N−1)-th time resources of a specific frequency position may be mapped to the N-th time resource of a different frequency position. In this case, the N-th time resource may be divided into a plurality of contiguous frequency resource.

Alternatively, as shown in FIG. 29, HARQ ACK/NACK signals for a plurality of data signals present in a time resource prior to an (N−1)-th (i.e., (N−2)-th) time resource from the first time resource of a specific frequency position may be mapped to the N-th time resource of a different frequency position. In this case, the N-th time resource may be divided into a plurality of contiguous frequency resource. Furthermore, the HARQ ACK/NACK signal for a data signal present in the (N−1)-th time resource may be mapped to the 2N-th time resource of a different frequency resource position. In this case, the 2N-th time resource may be divided into a plurality of contiguous frequency resources.

Figure 30:
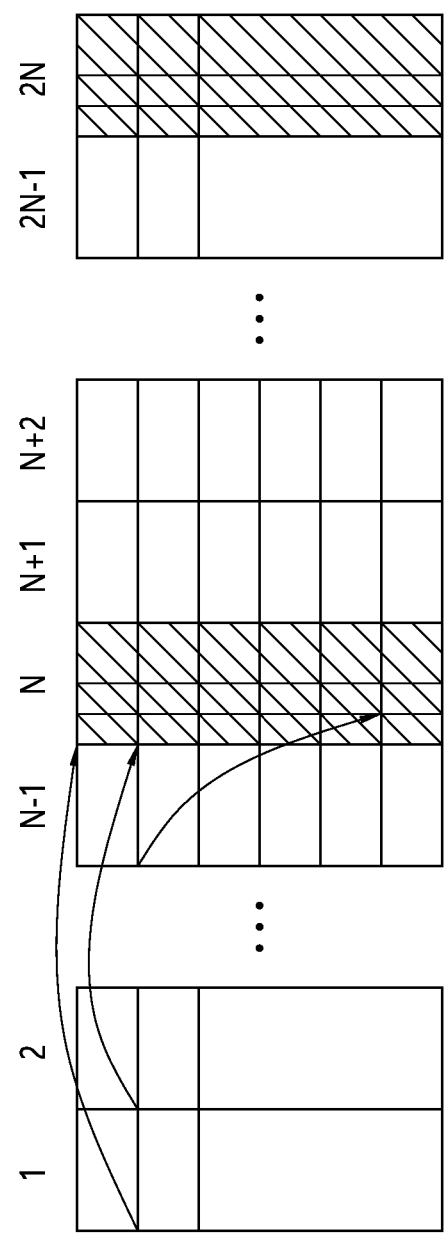

Alternatively, as shown in FIG. 30, all the frequency resource regions of an N-th time resource may be used for an HARQ ACK/NACK signal. In this case, HARQ ACK/NACK signals for a plurality of data signals present in the first to (N−1)-th time resources of a specific frequency position may be mapped to a plurality of frequency resources of an N-th time resource, respectively.

Figure 31:
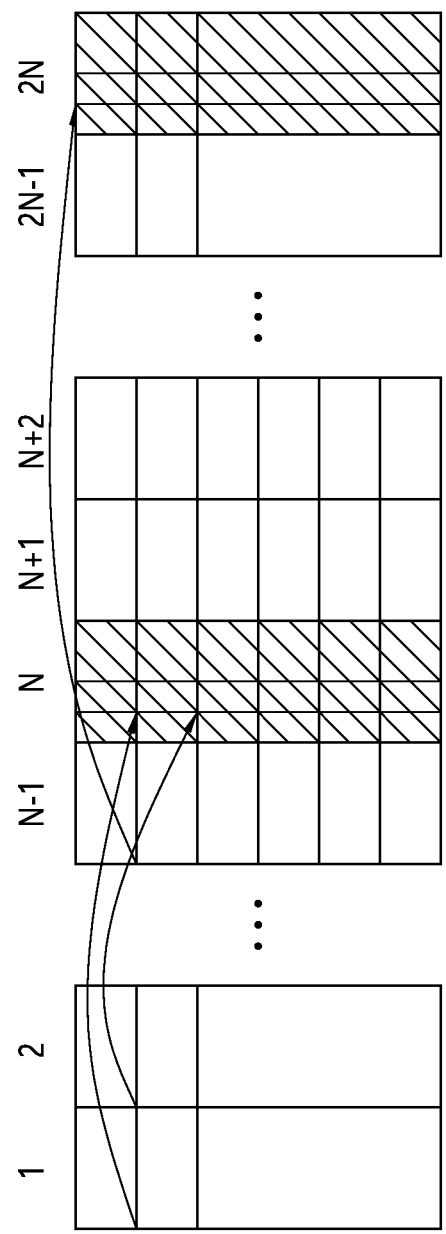

Alternatively, as shown in FIG. 31, HARQ ACK/NACK signals for a plurality of data signals present in a time resource prior to an (N−1)-th (i.e., (N−2)-th) time resource from the first time resource of a specific frequency position may be mapped to a plurality of frequency resources of an N-th time resource, respectively. Furthermore, the HARQ ACK/NACK signal for a data signal present in the (N−1)-th time resource may be mapped to a plurality of frequency resources of a 2N-th time resource.

In FIGS. 20 to 31 described so far, an HARQ ACK/NACK signal has been represented as being mapped to a specific time/frequency resource, for convenience of description. However, an HARQ ACK/NACK signal may be mapped to only some region of the specific time/frequency resource. For example, an HARQ ACK/NACK signal may be mapped to only a given some time resource within an N-th time resource to an (N+n)-th time resource or within a 2N-th time resource to a (2N+n)-th time resource.

Figure 32:
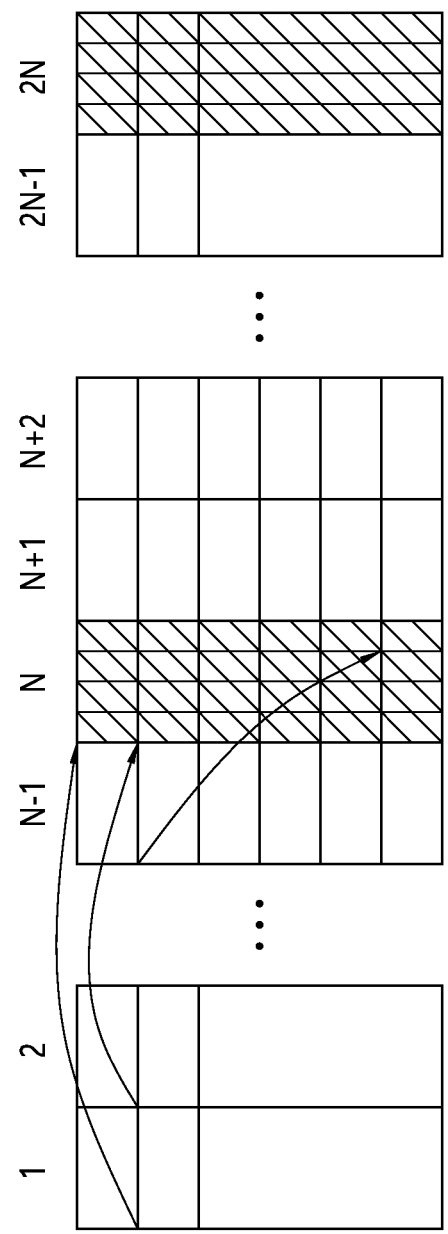

For example, as shown in FIG. 32, when an N-th time resource and a 2N-th time resource are used for an HARQ ACK/NACK signal, the N-th time resource may be divided into a plurality of time resources. Specifically, as shown in FIG. 32, the N-th time resource may be divided into four time resources. In this case, an HARQ ACK/NACK signal for a data signal present in the first time resource may be mapped to the first time resource within the N-th time resource. Furthermore, an HARQ ACK/NACK signal for a data signal present in the second time resource may be mapped to the second time resource within the N-th time resource. In this case, each time resource within the N-th time resource may all frequency resources.

Figure 33:
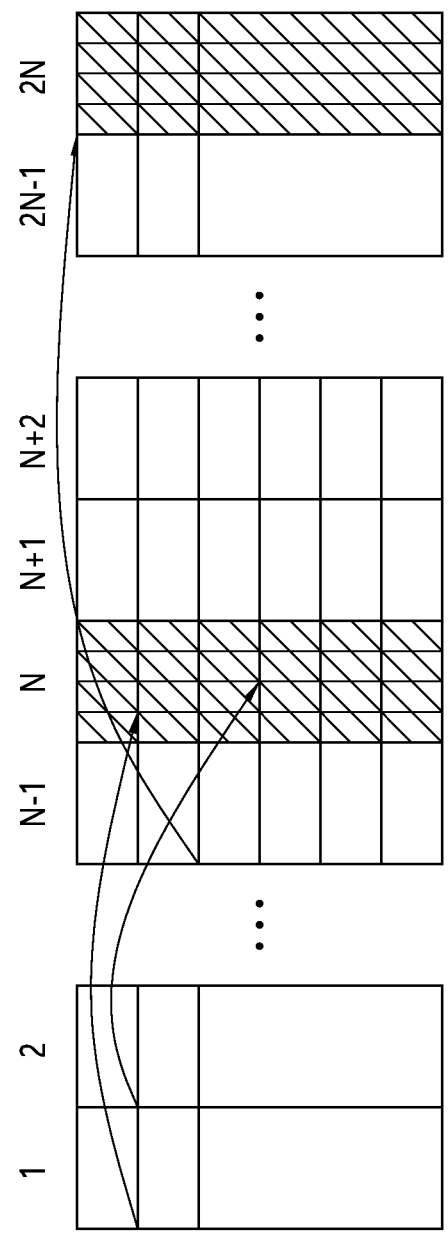

Alternatively, as shown in FIG. 33, HARQ ACK/NACK signals for a plurality of data signals present in a time resource prior to an (N−1)-th (i.e., (N−2)-th) time resource from the first time resource of a specific frequency position may be mapped to time resources divided within an N-th time resource, respectively. Furthermore, the HARQ ACK/NACK signal for a data signal present in the (N−1)-th time resource may be mapped to a time resource divided within a 2N-th time resource.

The schemes shown in FIGS. 20 to 33 may be combined. For example, one or more of FIGS. 24, 25, 28 and 29 may be combined like FIG. 34 or 35.

Figure 34:
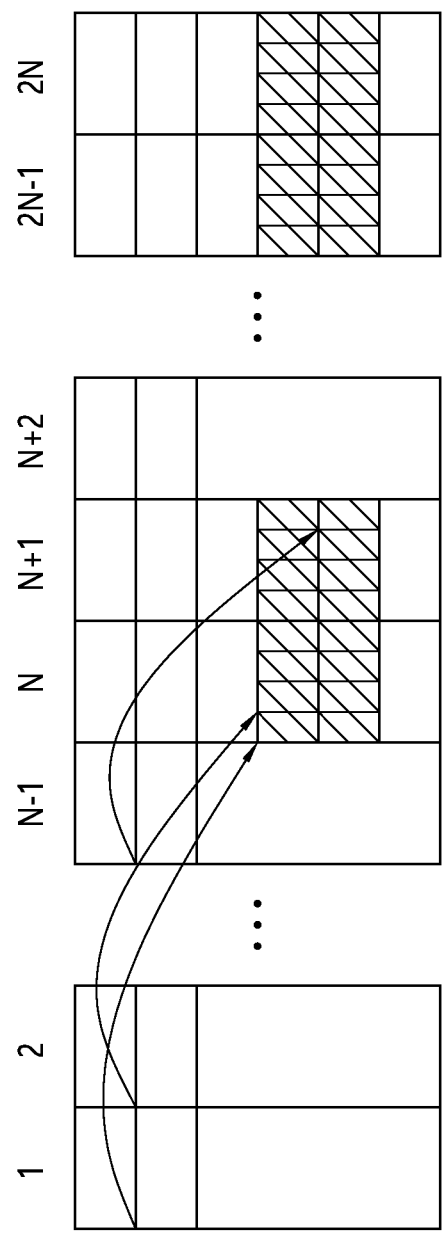

For example, referring to FIG. 34, resources for an HARQ ACK/NACK signal may be present from an N-th time resource to an (N+n)-th time resource, and a plurality of frequency resources may be present contiguously or discontiguously. Specifically, as may be seen with reference to FIG. 34, HARQ ACK/NACK signals for a plurality of data signals present in the first to (N−1)-th time resources of a specific frequency position may be mapped to two contiguous frequency resources from an N-th time resource to the (N+n)-th time resource.

Figure 35:
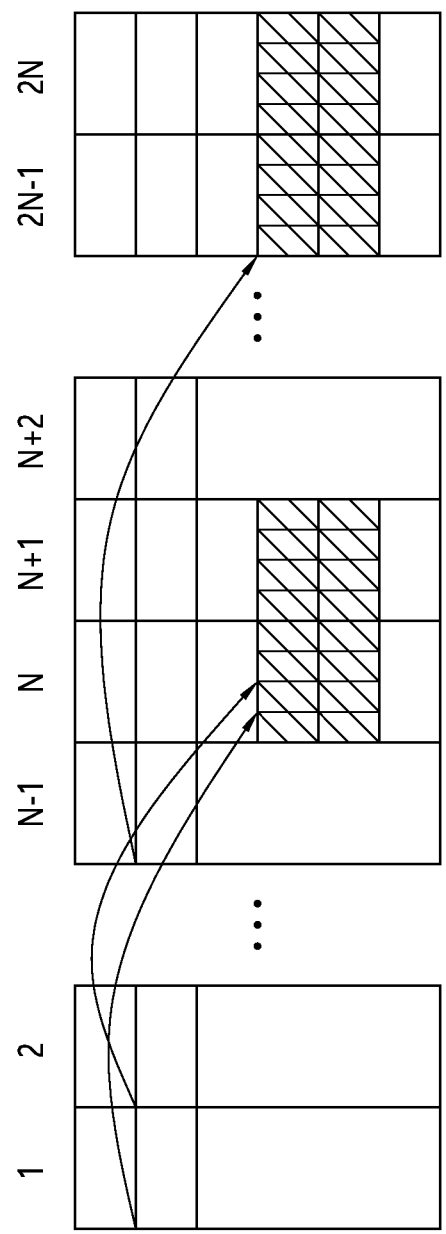

Referring to FIG. 35, HARQ ACK/NACK signals for a plurality of data signals present in time resources prior to an (N−1)-th (i.e., (N−2)-th) time resource from the first time resource of a specific frequency position may be mapped to some of two contiguous frequency resources within an N-th time resource to an (N+n)-th time resource. Furthermore, the HARQ ACK/NACK signal for a data signal present in the (N−1)-th time resource may be mapped to some of two contiguous frequency resources within a 2N-th time resource to a (2N+n)-th time resource.

Other combinations are possible in addition to the examples of the combinations shown in FIGS. 34 and 35. For example, a combination in which an HARQ ACK/NACK signal mapping scheme from an N-th time resource or an N-th time resource to an (N+n)-th time resource and an ACK/NACK signal mapping scheme from a 2N or 2N-th time resource to a (2N+n)-th time resource are modified is possible.

Meanwhile, a data signal may be received through a plurality of frequency resources within a specific time resource. An HARQ ACK/NACK signal mapping scheme for such a case is described below.

Figure 36:
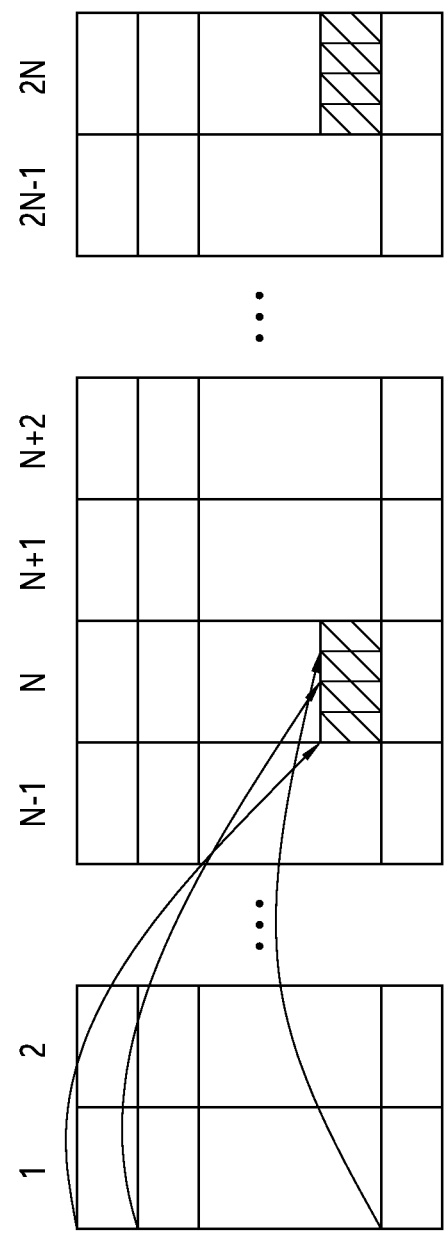

Referring to FIG. 36, an HARQ ACK/NACK signals for a data signal received through a plurality of frequency resources within the first time resource may be mapped to a specific frequency resource present in an N-th time resource. In this case, the N-th time resource may be divided into a plurality of time resources. Accordingly, an HARQ ACK/NACK signal for a data signal received through the first frequency resource within the first time resource may be mapped to the first time resource within the N-th time resource.

Figure 37:
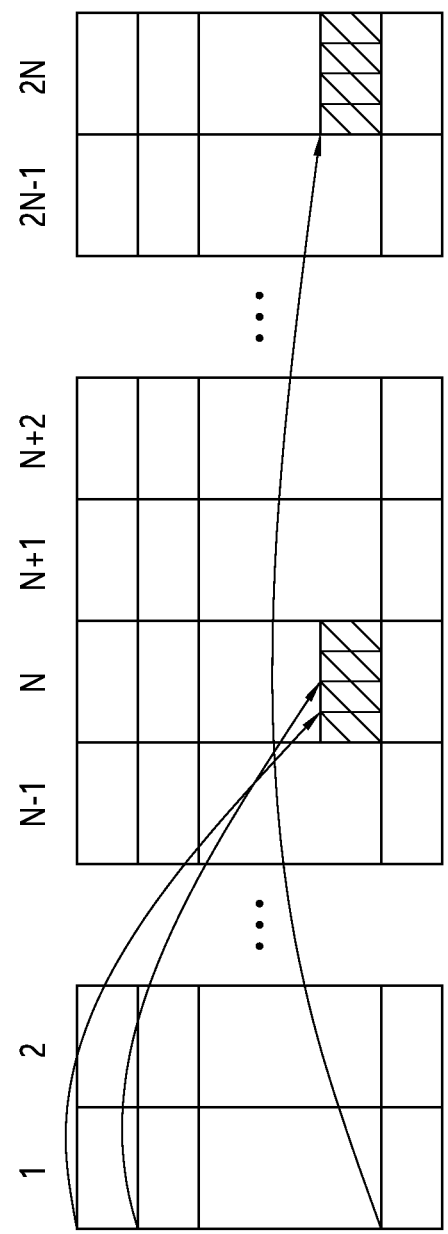

Alternatively, as shown in FIG. 37, an HARQ ACK/NACK signal for a data signal received through the first frequency resource within the first time resource may be mapped to the first time resource of a 2N-th time resource.

Figure 38:
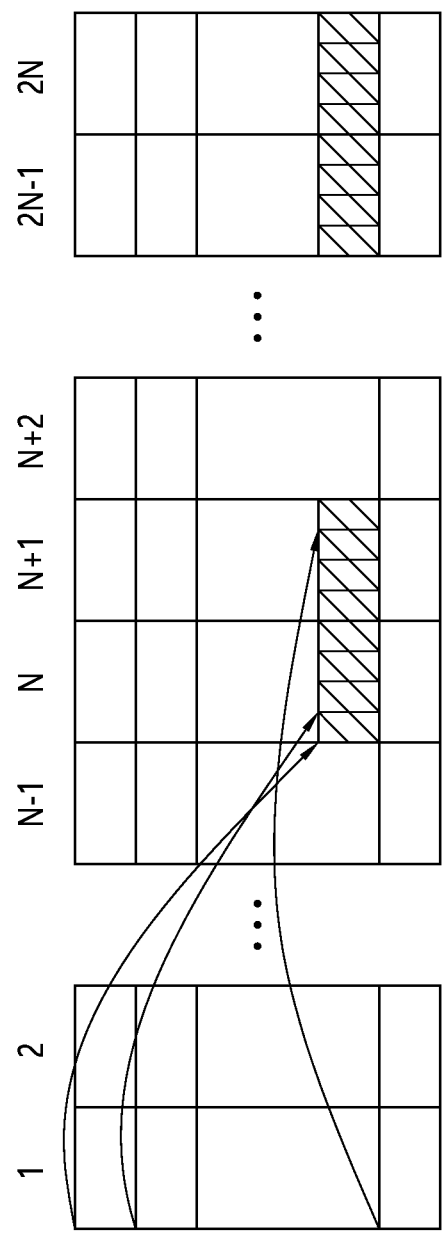

Alternatively, as shown in FIG. 38, HARQ ACK/NACK signals for a data signal received through a plurality of frequency resources within the first time resource may be mapped to an (N+n)-th time resource from an N-th time resource. In this case, n may be 1.

Figure 39:
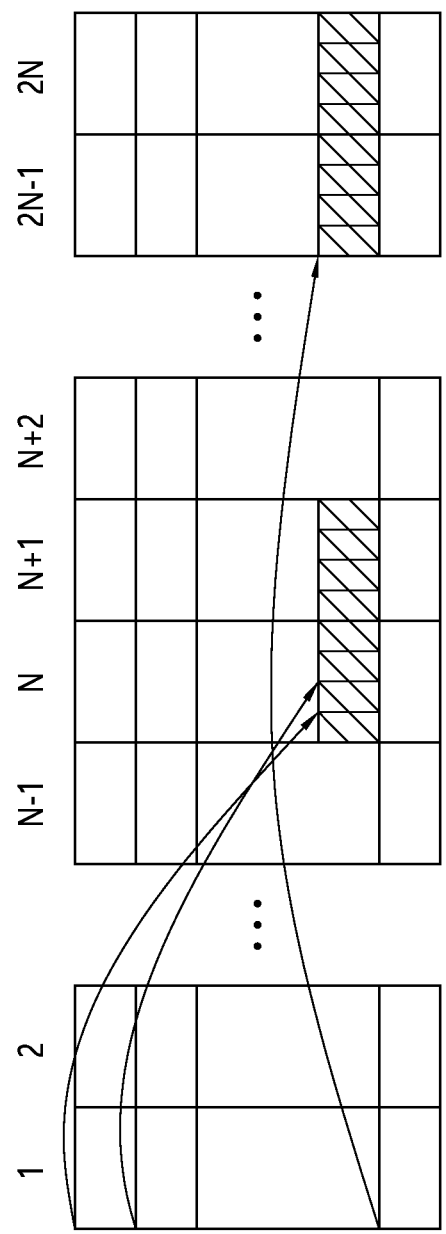

Alternatively, as shown in FIG. 39, an HARQ ACK/NACK signal for a data signal received through some frequency resource (e.g., the last frequency resource) within the first time resource may be mapped to some of resources within a 2N-th time resource to an (2N+n)-th time resource.

Figure 40:
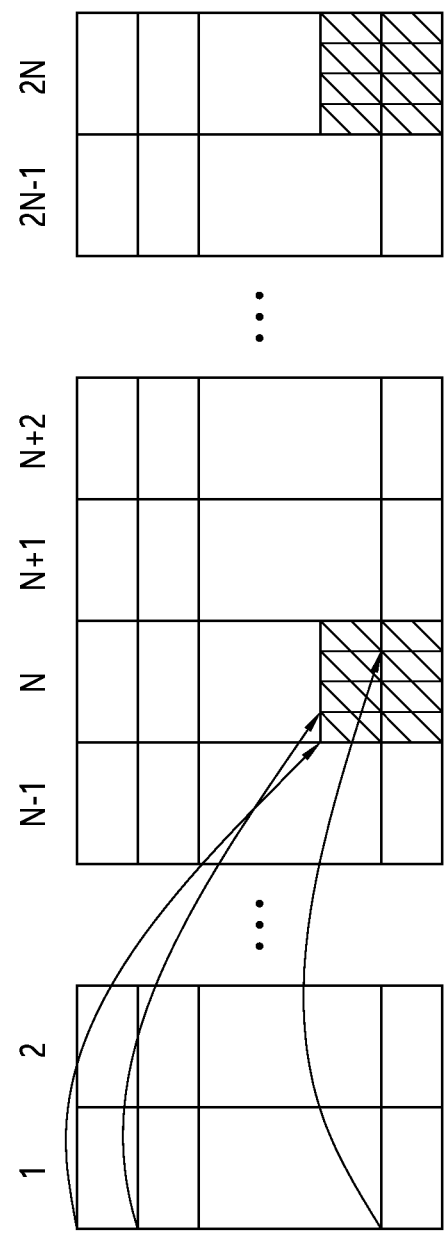

Alternatively, as shown in FIG. 40, HARQ ACK/NACK signals for a data signal received through a plurality of frequency resources within the first time resource may be mapped to a plurality of frequency resources within an N-th time resource. In this case, the N-th time resource may be divided into a plurality of time resources.

Figure 41:
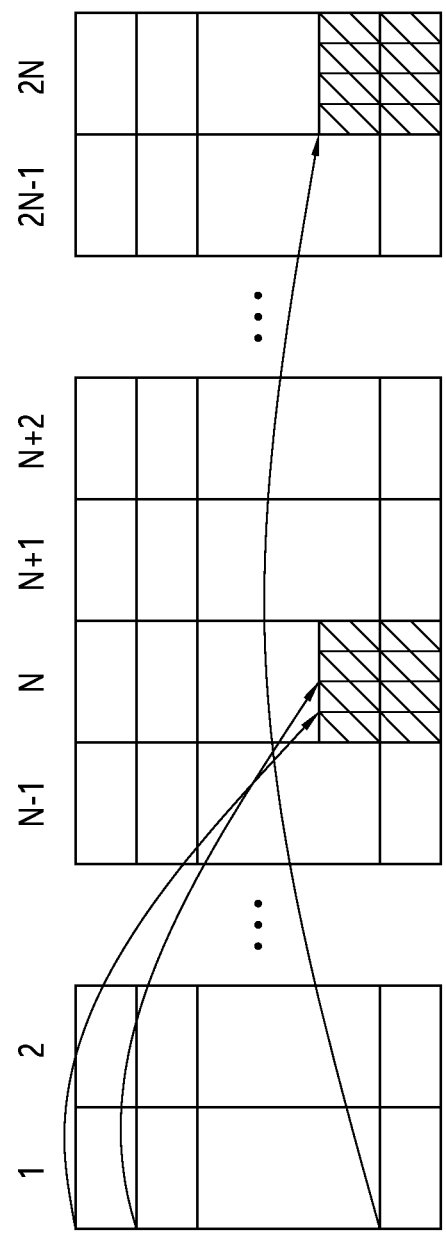

Alternatively, as shown in FIG. 41, an HARQ ACK/NACK signal for a data signal received through some frequency resource (e.g., the last frequency resource) within the first time resource may be mapped to some of a plurality of frequency resources within a 2N-th time resource.

Figure 42:
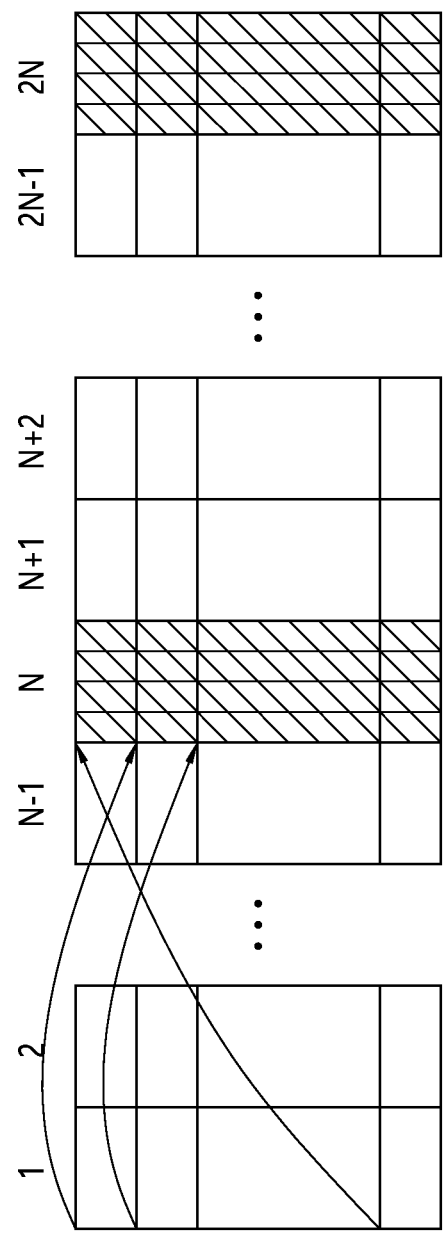

Alternatively, as shown in FIG. 42, HARQ ACK/NACK signals for a data signal received through a plurality of frequency resources through the first time resource may be mapped to a plurality of time resources within an N-th time resource. In this case, each of the plurality of time resources within the N-th time resource may use all frequency resources.

Figure 43:
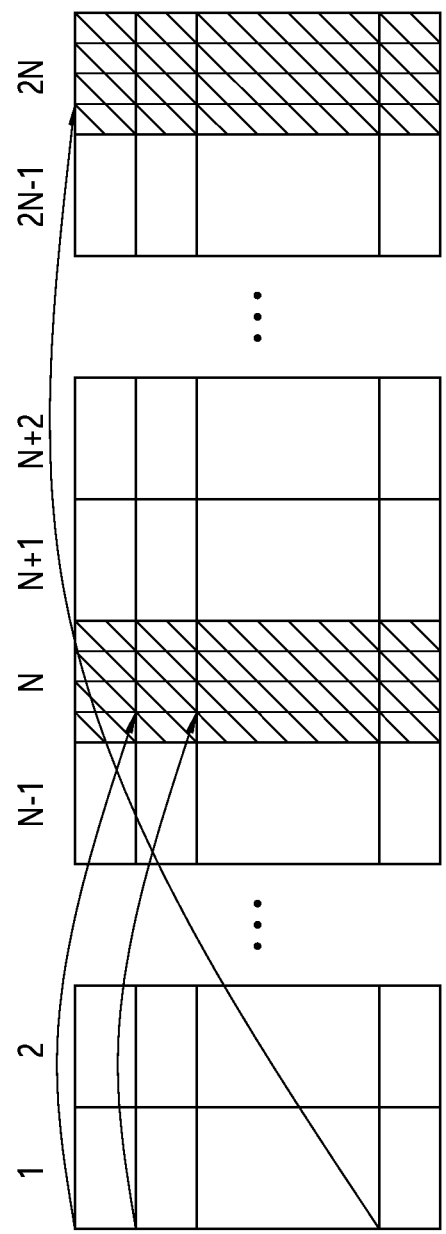

Alternatively, as shown in FIG. 43, an HARQ ACK/NACK signal for a data signal received through some frequency resource (e.g., the last frequency resource) within the first time resource may be mapped to some of a plurality of time resources within a 2N-th time resource. In this case, each of the plurality of time resources within the 2N-th time resource may use all frequency resources.

In the above drawings, an HARQ ACK/NACK signal has been represented as being mapped to a specific time/frequency resource, for convenience of description. However, an HARQ ACK/NACK signal may be mapped to only some region of the specific time/frequency resource. For example, an HARQ ACK/NACK signal may be mapped to only a given some time resource within an N-th time resource to an N+n time resource or within a 2N-th time resource to a 2N+n time resource.

Meanwhile, the schemes shown in FIGS. 36 to 43 may be combined. For example, one or more of FIGS. 38 to 43 may be combined and indicated like FIG. 44 or 45.

Figure 44:
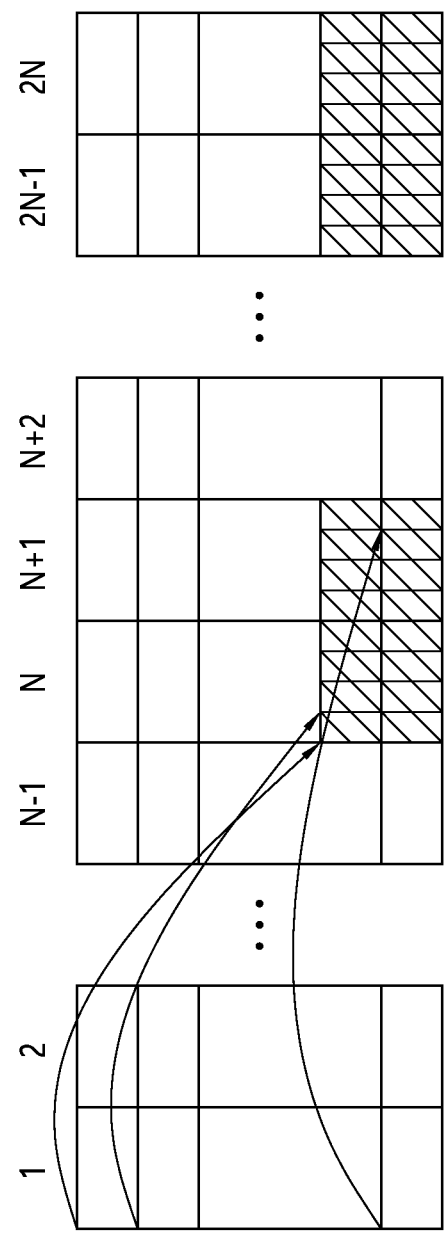

For example, referring to FIG. 44, a resource for an HARQ ACK/NACK signal may be present from an N-th time resource to an (N+n)-th time resource, and a plurality of frequency resources may be present contiguously or discontiguously. Specifically, as may be seen with reference to FIG. 44, HARQ ACK/NACK signals for a plurality of data signals transmitted through a plurality of frequency resource within the first time resource may be mapped to two contiguous frequency resources within time resources from the N-th time resource to the (N+n)-th time resource. In this case, n may be 1. the N-th and (N+1)-th first time resources may be divided into a plurality of time resource.

Figure 45:
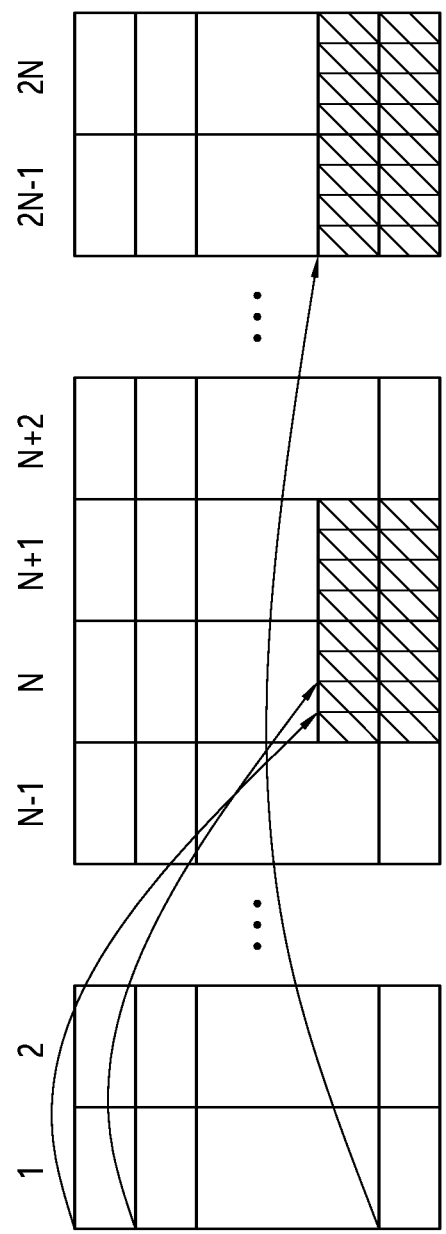

Alternatively, referring to FIG. 45, an HARQ ACK/NACK signal for a data signal transmitted in the last frequency resource of the first time resource may be mapped to some of two contiguous frequency resources within time resources from an 2N-th time resource to a (2N+n)-th time resource.

Other combinations are possible in addition to the examples of the combinations shown in FIGS. 44 and 45. For example, a combination in which the HARQ ACK/NACK signal mapping scheme of the N-th time resource or from the N-th time resource to the (N+n)-th time resource and the ACK/NACK signal mapping scheme from the 2N or 2N-th time resource to the (2N+n)-th time resource are modified is possible.

A scheme for mapping a corresponding HARQ ACK/NACK signal based on a data resource of a specific unit has been described so far. The resource region of an HARQ ACK/NACK signal corresponding to a plurality of data signals may overlap because an actual HARQ ACK/NACK signal consumes a significantly small resource compared to data. Accordingly, in some of the accompanying drawings, an arrow indicative of the resource of an HARQ ACK/NACK signal corresponding to a plurality of data signals indicates some overlapped region. That is, this indicates that a plurality of HARQ ACK/NACK signals may share a resource in order to improve resource efficiency because the size of a resource to which one HARQ ACK/NACK signal is mapped is small A scheme for a plurality of HARQ ACK/NACK signals to share a resource may be present in various forms, such as time/frequency/code. However, the description of this specification may be applied regardless of a method in which HARQ ACK/NACK signals share a resource.

If a plurality of HARQ ACK/NACK signals shares a resource, that is, a UE may determine some or all resources belonging to the remaining resource pool, except a resource reserved for the HARQ ACK/NACK signal of another UE checked based on information collected using its own method (e.g., sensing) or information received from another device (e.g., a different UE, a base station or a network) or a combination of the information, to be a sharable (available) resource. This is described below.

Scheme 1) the resource occupancy situation of other UEs which may be checked based on information received through another UE or network and a resource mapped for the HARQ ACK/NACK signal of another UE may be excluded from an available resource.

Figure 46:
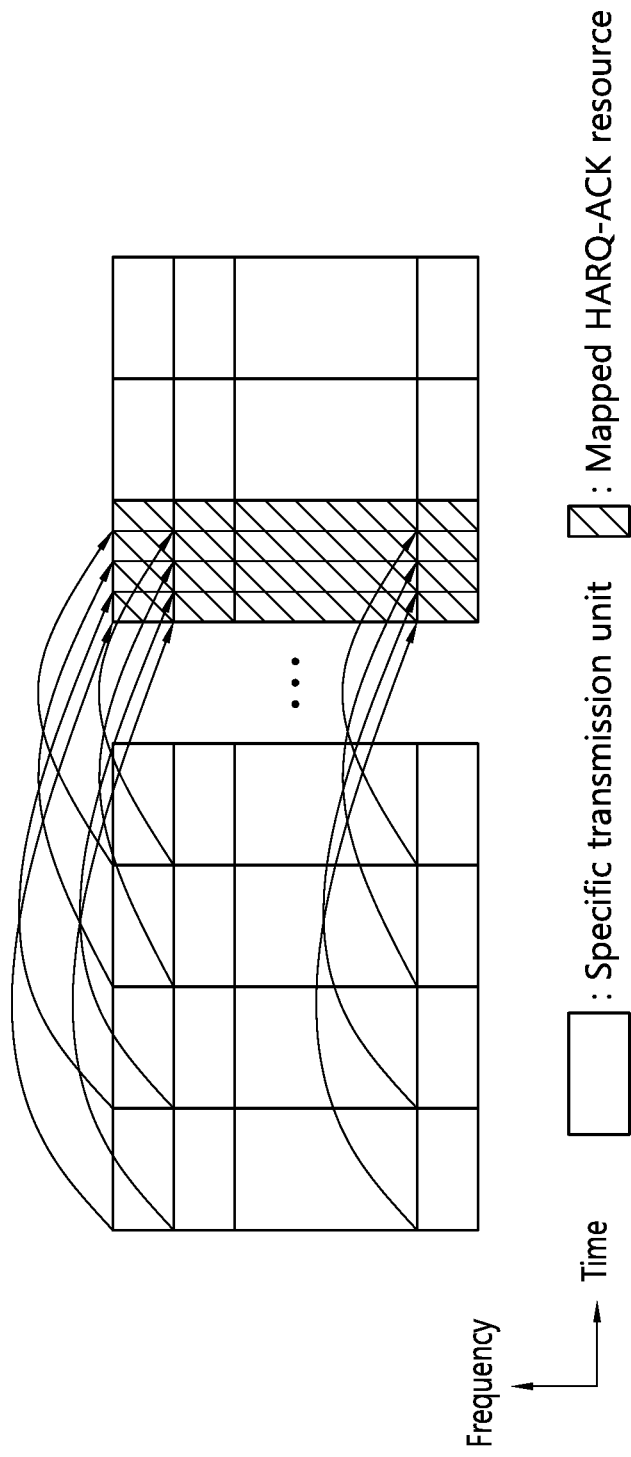
Figure 47:
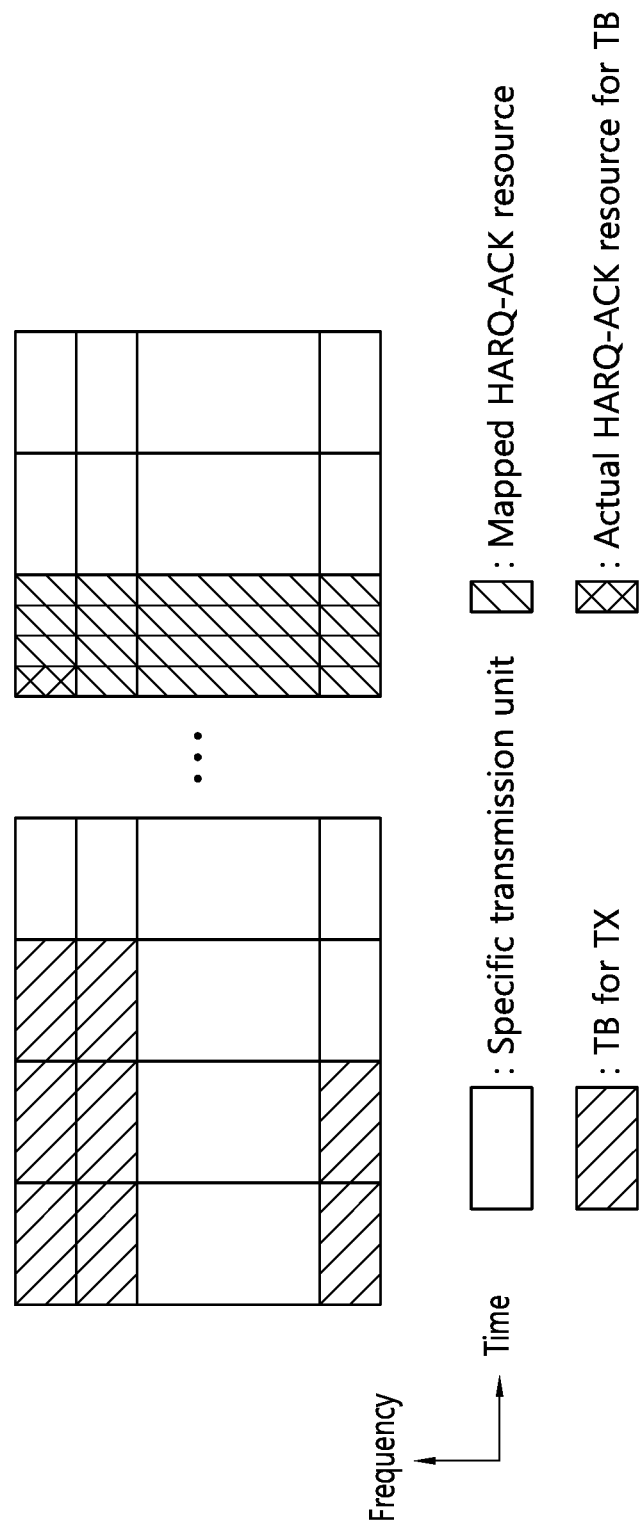

Scheme 2) if a reserved resource is divided in a plurality of units for a data signal transmitted in a transport block (TB) unit and it is recognized that one or more HARQ ACK/NACK signals are not actually mapped, a resource for the corresponding HARQ ACK/NACK signal is recognized as a sharable (available) resource. For example, as shown in FIG. 46, assuming that HARQ ACK/NACK signals for data signals through the time resources of a specific frequency position are mapped to an N-th time resource, a data signal of a TB unit that requires n resources for transmission also requires n resources for an HARQ ACK/NACK signal, but an actually necessary HARQ ACK/NACK signal resource may be n or less in number. An example in which a data signal of a TB unit that requires n resources for transmission uses only one of n mapped HARQ ACK/NACK signal resources is shown in FIG. 47. It is assumed that if the number of actually necessary HARQ ACK/NACK signal resources is m (m<n), there is a TB that requires n resources. In this case, the number of resources not used among HARQ ACK/NACK signal resources respectively mapped to the n data signals is n-m. That is, some of or all (n-m) HARQ ACK/NACK signal resources may be recognized as a sharable (available) resource.

Scheme 3) the resource occupancy situation of other UEs and some of or all HARQ ACK/NACK signal resources mapped thereto may be recognized as a non-sharable (unavailable) resource based on information received through another device (e.g., a different UE, eNB or network) in a pre-defined form or a form recognizable by a UE.

Scheme 4) assuming that a UE applied to 1 is an enhanced UE and a UE not applied to 1 is the existing UE, the existing UE may exclude all HARQ ACK/NACK signal resources, mapped to a reserved resource, from an available resource.

Scheme 5) Schemes 1 to 4 may be combined.

Meanwhile, a scheme of indicating a resource position after an HARQ ACK/NACK signal is mapped to a resource for each data signal of a specific transmission unit may be as follows.

Scheme 1) an HARQ ACK/NACK signal is mapped according to any one of the schemes shown in FIGS. 8 to 47. In this case, a mapping scheme and an accurate mapping position of the HARQ ACK/NACK signal are previously designated so that they can be known to a transmission UE and a reception UE without separate signaling.

Scheme 2) an HARQ ACK/NACK signal is mapped to according to any one of the schemes shown in FIGS. 8 to 47.

Scheme 2-A) a mapping scheme is previously designated, but a base station configures a detailed position where an HARQ ACK/NACK signal is actually mapped and notifies a transmission UE and a reception UE of the detailed position.

Scheme 2-B) all detailed resource positions where HARQ ACK/NACK signals are mapped are previously designated according to each of the schemes shown in FIGS. 8 to 47, but a base station configures which mapping scheme will be used and notifies a transmission UE and a reception UE of a corresponding scheme.

Scheme 2-C) all detailed resource positions where HARQ ACK/NACK signals are mapped are previously designated according to each of the schemes shown in FIGS. 8 to 47, but a base station configures which mapping scheme will be used and information on a detailed resource position and notifies a transmission UE and a reception UE of them.

Scheme 3) any one of the schemes shown in FIGS. 8 to 47 is dynamically determined.

Scheme 3-A) a base station or a transmission UE determines a resource position where an HARQ ACK/NACK signal is mapped according to any one of the schemes shown in FIGS. 8 to 47 when it transmits a data signal, and notifies a reception UE of the determined resource position.

Scheme 3-B) a base station or a transmission UE determines direct information on a resource position where an HARQ ACK/NACK signal is mapped or information or an equation that enables the resource position to be checked when it transmits a data signal according to any one of the schemes shown in FIGS. 8 to 47, and notifies a reception UE of the determined information or equation.

The embodiments of the present invention described so far may be implemented through various means. For example, the embodiments of the present invention may be implemented by hardware, firmware, software or a combination of them. Specifically, this is described with reference to this drawing.

Figure 48:
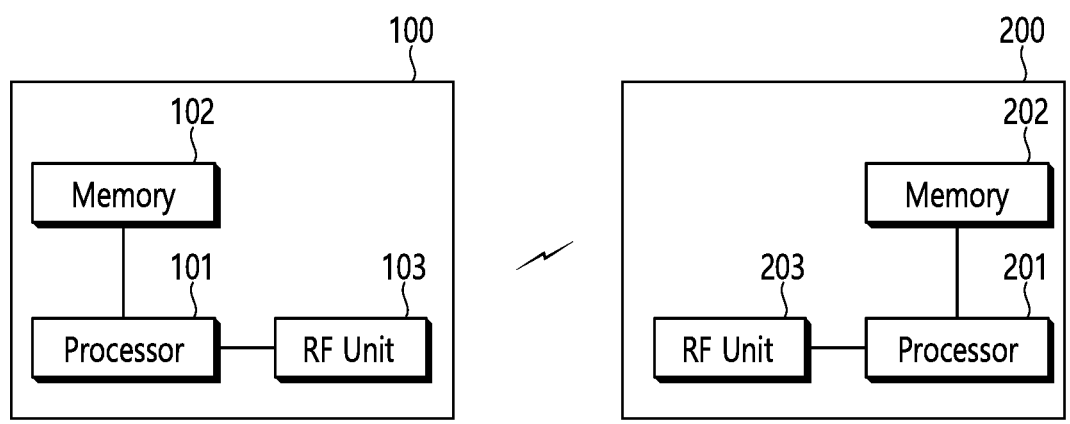
FIG. 48 is a block diagram of a wireless communication system in which the disclosure of this specification is implemented.

FIG. 48 is a block diagram of a wireless communication system in which the disclosure of this specification is implemented.

A base station 200 includes a processor 201, a memory, 202 and a radio frequency (RF) unit 203. The memory 202 is connected to the processor 201 and stores a variety of types of information for driving the processor 201. The RF unit 203 is connected to the processor 201 and transmits and/or receives radio signals. The processor 201 implements the proposed function, process and/or method. In the above-described embodiment, the operation of the base station may be implemented by the processor 201.

A UE 100 includes a processor 101, a memory 102 and an RF unit 103. The memory 102 is connected to the processor 101 and stores a variety of types of information for driving the processor 101. The RF unit 103 is connected to the processor 101 and transmits and/or receives radio signals. The processor 101 implements the proposed function, process and/or method.

The processor may include application-specific integrated circuits (ASICs), other chipsets, logic circuits and/or data processing devices. The memory may include read-only memory (ROM), random access memory (RAM), flash memory, memory cards, storage media and/or other storage devices. The RF unit may include a baseband circuit for processing a radio signal. When an embodiment is implemented in software, the above-described scheme may be implemented as a module (process, function, etc.) for performing the above-described function. The module may be stored in the memory and executed by the processor. The memory may be placed inside or outside the processor and connected to the processor using a variety of well-known means.

In the above-described illustrative embodiments, although the methods have been described based on the flowcharts in the form of a series of steps or blocks, the present invention is not limited to the sequence of the steps, and some of the steps may be performed in the sequence different from that of other steps or may be performed simultaneously with other steps. Furthermore, those skilled in the art will understand that the steps shown in the flowchart are not exclusive and the steps may include additional steps or that one or more steps in the flowchart may be deleted without affecting the range of right of the present invention.

What is claimed is:

1. A method of transmitting a hybrid automatic repeat request (HARQ) acknowledgement/negative-acknowledgement (ACK/NACK) signal through a sidelink, the method comprising:
   receiving, from a transmission UE, data via a physical sidelink shared channel (PSSCH) in a first time resource; and
   transmitting a HARQ ACK/NACK signal in a second time resource of a resource pool;
   transmitting data via the PSSCH;
   wherein a gap duration is present between the first time resource and the second time resource,
   wherein the resource pool includes one or more time resources, and
   wherein the second time resource consists of 2 symbols.

2. The method of claim 1,
   wherein the first resource includes a plurality of symbols, and
   wherein the data received via the PSSCH is not received in at least one symbol, among the plurality of symbols, in which the HARQ ACK/NACK signal is transmitted.

3. The method of claim 1, wherein the HARQ ACK/NACK signal is for the data received from the transmission UE on a sidelink subframe n-k.

4. The method of claim 1, wherein the gap duration is a half-symbol size or one symbol size.

5. The method of claim 1, wherein the second time resource comprises automatic gain control (AGC).

6. The method of claim 1, wherein the second time resource comprises a reference signal for demodulating the HARQ ACK/NACK signal.

7. The method of claim 1, wherein a last part of the second time resource comprises a gap duration.

8. A user equipment (UE) transmitting a hybrid automatic repeat request (HARQ) acknowledgement/negative-acknowledgement (ACK/NACK) signal through a sidelink, the UE comprising:
   a processor;
   a receiver configured to receive data via a physical sidelink shared channel (PSSCH) in a first time resource; and
   a transmitter
   wherein the transmitter transmits a HARQ ACK/NACK signal in a second time resource of a resource pool,
   wherein the transmitter transmits data via the PSSCH,
   wherein a gap duration is present between the first resource and the second time resource,
   herein the resource pool includes one or more time resources, and
   wherein the second time resource consists of 2 symbols.

9. The method of claim 8,
   wherein the first resource includes a plurality of symbols, and
   wherein the data received via the PSSCH is not received in at least one symbol, among the plurality of symbols, in which the HARQ ACK/NACK signal is transmitted.

10. The UE of claim 9, wherein a last part of the second time resource comprises a gap duration.

11. The UE of claim 8, wherein the HARQ ACK/NACK signal is for the data received from the transmission UE on a sidelink subframe n-k.

12. The UE of claim 8, wherein the gap duration is a half-symbol size or one symbol size.

13. The UE of claim 8, wherein the second time resource comprises automatic gain control (AGC).

14. The UE of claim 8, wherein the second time resource comprises a reference signal for a of demodulating the HARQ ACK/NACK signal.

* * * * *